United States Patent
Mizuno

(10) Patent No.: US 7,342,869 B2
(45) Date of Patent: Mar. 11, 2008

(54) OPTICAL-RECORDING MEDIUM PLAYBACK APPARATUS AND OPTICAL-RECORDING MEDIUM, INCLUDING FLYING OPTICAL HEAD FEATURES

(75) Inventor: Takeshi Mizuno, Tokyo (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 10/609,615

(22) Filed: Jul. 1, 2003

(65) Prior Publication Data
US 2004/0047271 A1 Mar. 11, 2004

(30) Foreign Application Priority Data

| Jul. 8, 2002 | (JP) | ............................ P2002-199199 |
| Jul. 8, 2002 | (JP) | ............................ P2002-199221 |
| Aug. 14, 2002 | (JP) | ............................ P2002-236249 |

(51) Int. Cl.
*G11B 7/135* (2006.01)

(52) U.S. Cl. .................................. 369/112.24; 369/118

(58) Field of Classification Search ...................... None
See application file for complete search history.

(56) References Cited

U.S. PATENT DOCUMENTS

| 5,828,643 A | * | 10/1998 | Takeda et al. | ......... | 369/112.12 |
| 6,091,700 A | * | 7/2000 | Kobayashi | ............... | 369/275.4 |
| 6,256,154 B1 | * | 7/2001 | Kubota et al. | .............. | 359/728 |
| 6,385,157 B1 | * | 5/2002 | Nakano | .................. | 369/112.02 |
| 6,778,485 B2 | * | 8/2004 | Yoshikawa et al. | .... | 369/112.02 |
| 6,992,965 B1 | * | 1/2006 | Glushko et al. | ............ | 369/103 |
| 7,042,826 B2 | * | 5/2006 | Matsui | .................. | 369/112.24 |
| 2002/0089916 A1 | * | 7/2002 | Lee et al. | .................... | 369/222 |

* cited by examiner

*Primary Examiner*—William Korzuch
*Assistant Examiner*—Joseph Haley
(74) *Attorney, Agent, or Firm*—Oblon, Spivak, McClelland, Maier & Neustadt, P.C.

(57) ABSTRACT

An optical-recording-medium playback apparatus includes a first optical member which focuses light emitted from a light-emitting unit on an optical recording medium, a second optical member which focuses light reflected by the optical recording medium, a light-receiving unit which receives the light focused by the second optical member, and a pinhole which is disposed between the second optical member and the light-receiving unit. The focal point of the light focused by the first optical member and that of the light focused by the second optical member correspond to each other. Accordingly, when the pinhole only transmits light which passes through positions around the focal point of the second optical member, stray light from positions around the focal point of the first optical member (in particular, light reflected by recording layers other than the one from which information is read out) can be removed.

13 Claims, 18 Drawing Sheets

← DEFAULT LAYER

OPTICAL-RECORDING MEDIUM PLAYBACK APPARATUS AND OPTICAL-RECORDING MEDIUM, INCLUDING FLYING OPTICAL HEAD FEATURES

BACKGROUND OF THE INVENTION

1. Field of the Invention

The present invention relates to optical recording media and optical-recording-medium playback apparatuses for playing back information recorded on the optical recording media. More specifically, the present invention relates to an optical recording medium having a plurality of recording layers and an optical-recording-medium playback apparatus for playing back information recorded on the optical recording medium.

2. Description of the Related Art

Optical-recording-medium playback apparatuses which read out (playback) information recorded on optical recording media, such as compact discs (CDs) and digital versatile discs (DVDs), by optical means are known in the art. In such an optical-recording-medium playback apparatus, a recording layer of an optical recording medium is irradiated with light, and information recorded on the optical recording medium is read out by detecting the intensity, etc., of light reflected by the recording layer. In addition, the optical-recording-medium playback apparatus may also be used for recording information on the optical recording medium as necessary.

In some optical recording media, a plurality of recording layers are provided so as to achieve a large capacity. For example, DVDs have two recording layers while CDs have only one recording layer. In accordance with the increase in the capacities of optical recording media, the number of recording layers is expected to increase further.

However, as the number of recording layers increases, it becomes more difficult to completely separate signals representing information recorded on different recording layers. When, for example, a recording layer from which information is to be read out is irradiated with light in an information readout operation of an optical recording medium, this light also passes through recording layers other than the one from which information is to be read out. Therefore, the light reflected by the optical recording medium includes light reflected by the recording layers other than the one from which information is to be read out. This additional light (stray light) increases as the number of recording layers increases, and functions as noise in the information readout operation. Accordingly, a signal-to-noise (S/N) ratio of a playback signal is decreases.

On the other hand, optical-recording-medium playback apparatuses using near-field light have recently been attracting attention. In particular, in optical-recording-medium playback apparatuses using solid immersion lenses (SILs), the focal spot size of a light beam can be reduced since the SILs have a high numerical aperture (NA), and a high recording density can be achieved. In addition, the SILs are highly compatible with conventional optical disc systems, and optical-recording-medium playback apparatuses using the SILs are therefore expected to become increasingly popular.

However, there is a limit to increasing the memory capacity of the optical-recording-medium playback apparatuses using the SILs. This is because since the recording density is determined depending on the wavelength of light, it is difficult to increase the recording density beyond a certain limit.

In addition, tracking must be performed in order to playback the information recorded on the optical recording medium, and it is necessary to form grooves or the like for tracking on the optical recording medium.

The grooves for tracking are preferably formed on each of the recording layers, and the grooves are required to have a certain depth, for example, about $\lambda/6$ in a push-pull method and about $\lambda/4$ in a differential phase detection (DPD) method ($\lambda$ is the wavelength of a light source).

Accordingly, the interval between the recording layers must be increased to some extent, and there is a possibility that this will be a barrier to the development of optical recording media having multiple recording layers.

SUMMARY OF THE INVENTION

In order to overcome the above-described disadvantages, a first object of the present invention is to provide an optical-recording-medium playback apparatus which can reduce the influence of stray light form recording layers other than the one from which information is to be read out in an information readout operation of an optical recording medium having a plurality of recording layers.

A second object of the present invention is to provide an optical-recording-medium playback apparatus which can increase the capacity of an optical recording medium.

A third object of the present invention is to provide an optical-recording-medium playback apparatus and an optical recording medium which can reduce the interval between the recording layers.

In order to attain the first object of the present invention, an optical-recording-medium playback apparatus according to one aspect of the present invention is constructed as described below.

1A. An optical-recording-medium playback apparatus according to the present invention includes a light-emitting unit which emits light; an optical recording medium having a plurality of recording layers from which information can be optically read out; a first optical member which focuses the light emitted from the light-emitting unit onto the optical recording medium, the light focused on the optical recording medium being reflected by the optical recording medium and passing again through the first optical member; a second optical member which focuses the light reflected by the optical recording medium and passing through the first optical member; a light-receiving unit which receives the light focused by the second optical member; and a pinhole which is disposed between the second optical member and the light-receiving unit.

The optical-recording-medium playback apparatus includes the pinhole which restricts the light incident on the light-receiving unit. The focal point of the light focused by the first optical member and that of the light focused by the second optical member correspond to each other. Accordingly, when the pinhole only transmits light which passes through positions around the focal point of the second optical member, stray light from positions around the focal point of the first optical member (in particular, light reflected by the recording layers other than the one from which information is read out) can be removed. As a result, the S/N ratio of a playback signal obtained when the information is read out from one of the plurality of recording layers can be increased.

(1) The size of the pinhole may be approximately the same as the size of an Airy disk.

The Airy disk is a pattern of light obtained when monochromatic light is ideally focused (without aberration) after passing through a lens or the like having a certain aperture. The diameter $\phi$ of the Airy disk is defined as $\phi=1.22\lambda/NA$ when $\lambda$ is the wavelength of light and NA is the numerical aperture. Accordingly, when the size of the pinhole is approximately the same as the size of the Airy disc, the S/N ratio of the playback signal can be further increased.

(2) The pinhole may be formed by spatially restricting the size of a light-receiving surface of the light-receiving unit.

When the size of the light-receiving surface is spatially restricted, the light incident on the light-receiving unit can be restricted. Accordingly, it is not necessary to form the pinhole separately from the light-receiving unit, and the pinhole which is integral with the light-receiving unit can be easily manufactured. Since the light-receiving unit and the pinhole are integral with each other, problems regarding alignment, fixing, and displacement due to degradation over time between them can be reduced.

(3) The light-emitting unit may include a light-emitting element which emits light and a reflective mirror which reflects the light emitted from the light-emitting element.

In such a case, the direction of the light emitted from the light-emitting unit can be set more freely by using the mirror which reflects the light. More specifically, the light-emitting unit may be constructed by forming an edge-emitting laser and a reflective mirror on a semiconductor substrate.

(4) The light-emitting unit, the pinhole, and the light-receiving unit may be integrally formed on a single substrate.

When these components are formed integrally, problems regarding alignment, fixing, and displacements due to degradation over time between them can be eliminated.

(5) The first optical member may include a first lens and a second lens, the second lens being positioned closer to the optical recording medium than the first lens.

In this case, the second lens may have a surface which faces a surface of the optical recording medium with a gap therebetween of less than the wavelength of the light emitted from the light-emitting unit.

When the second lens is in the vicinity of the surface of the optical recording medium, the light can be focused on the optical recording medium by using evanescent light. As a result, the numerical aperture of the first optical member can be increased to one or more, and the information can be read out from the optical recording medium with high resolution. Accordingly, the memory capacity of the optical recording medium can be increased.

(6) The optical-recording-medium playback apparatus may further include a focal-position-adjusting unit which adjusts a focal position of the light focused by the first optical member in the thickness direction of the optical recording medium.

In this case, the focal-position-adjusting unit may include an a focal optical system, a refractive-index-varying device, or wedge prisms.

(7) The optical-recording-medium playback apparatus may further include a detecting unit which detects at least one of the focus, tracking, and tilt states of the optical recording medium.

The focus, tracking, and tilt states correspond to a displacement of the focal position of the incident light with respect to the recording layer from which the information is read out in the depth direction, a displacement of the incident light with respect to the track of the recording layer, and the tilt of the incident light with respect to the optical recording medium, and can be output from the detecting unit as a focus error signal, a tracking error signal, and a tilt signal, respectively.

When the above-described detecting unit is provided, focus control, tracking control, and tilt control can be performed for each of the recording layers.

1B. According to another aspect of the present invention, an optical-recording-medium playback apparatus includes a light-emitting unit which emits light; a stage which retains an optical recording medium having a plurality of recording layers from which information can be optically read out; a first optical member which focuses the light emitted from the light-emitting unit onto the optical recording medium, the light focused on the optical recording medium being reflected by the optical recording medium and passing again through the first optical member; a second optical member which focuses the light reflected by the optical recording medium and passing through the first optical member; a light-receiving unit which receives the light focused by the second optical member; and a pinhole which is disposed between the second optical member and the light-receiving unit.

The optical recording medium is placed on the stage. Accordingly, the optical recording medium is not necessarily included in the optical-recording-medium playback apparatus as a component thereof, and can be detached from the optical-recording-medium playback apparatus.

Other components of this optical-recording-medium playback apparatus according to Item 1B are substantially similar to those of the optical-recording-medium playback apparatus according to Item 1A.

In order to attain the second object of the present invention, an optical-recording-medium playback apparatus according to the present invention is constructed as described below.

2A. An optical-recording-medium playback apparatus according to the present invention includes a light-emitting unit which emits light; an optical recording medium having a plurality of recording layers from which information can be optically read out; an optical head which focuses the light emitted from the light-emitting unit onto one of the recording layers of the optical recording medium, the optical head having a surface which faces a surface of the optical recording medium with a gap therebetween of less than the wavelength of the light emitted from the light-emitting unit; an optical member which focuses returning light which returns from the optical recording medium in response to the light focused by the optical head; and a light-receiving unit which receives the returning light focused by the optical member.

As described above, the optical-recording-medium playback apparatus includes the optical recording medium having a plurality of recording layers and the optical head which focuses the light emitted from the light-emitting unit onto one of the recording layers of the optical recording medium. In addition, the optical head has a surface which faces the surface of the optical recording medium with a gap therebetween of less than the wavelength of the light emitted from the light-emitting unit.

Since the surface of the optical head and the surface of the optical recording medium is in the vicinity of each other with a gap therebetween of less than the wavelength of the light emitted from the light-emitting unit, these surfaces can be connected to each other with evanescent light. In this case, the influence of the refractive index of an air layer, etc., between these surfaces can be ignored, so that the numerical aperture NA can be easily increased. As a result, the resolution in reading out and recording information, that is, the recording density of the optical recording medium, can be increased.

In addition, since a plurality of recording layers are provided and the light is selectively focused on one of the recording layers, the memory capacity of the optical recording medium can be increased along with the number of recording layers.

(1) The returning light may include light which is transmitted, reflected, or generated at one of the recording layers of the optical recording medium.

Accordingly, the light which is transmitted, reflected, or generated at one of the recording layers can be used for reading out the information recorded on the recording layer.

(2) The returning light may be incoherent.

When the returning light is incoherent, noise due to multiple reflection of the returning light between the recording layers can be avoided. In such a case, the recording layers can be designed without taking the optical interference between them into account and the thickness of each recording layer, for example, can be reduced.

Incoherent returning light can be obtained by emitting incoherent light from the light-emitting unit or by generating incoherent light at the recording layers in correspondence with the light incident thereon.

(3) The wavelength of the returning light may be different from the wavelength of the light emitted from the light-emitting unit.

When the light emitted from the light-emitting unit and the returning light have different wavelengths, they can be more reliably separated from each other.

The returning light with a wavelength different from that of the light emitted from the light-emitting unit can be obtained by, for example, generating fluorescent light at the pits on the recording layers.

(4) The optical head may be a flying optical head which flies above the optical recording medium due to an air flow which occurs when the flying optical head moves relative to the optical recording medium.

When the flying optical head is used, the information readout operation can be reliably performed even when the optical recording medium is scanned with the optical head.

When the flying optical head moves "relative to" the optical recording medium, either one or both of the optical recording medium and the optical head are moved.

(5) The optical-recording-medium playback apparatus may further include a recording-layer-identifying unit which identifies the recording layer on which the light emitted from the light-emitting unit is focused.

In such a case, the recording layer which is being subjected to an information readout/recording operation can be determined by using the recording-layer-identifying unit.

The recording-layer-identifying unit may identify each of the recording layers by referring to a table which shows the relationship between the depth of each of the recording layers and the intensity of the returning light.

Since the depth of each recording layer is related to the intensity of the returning light, the recording layer on which the light is focused can be identified by referring to the table which shows the relationship between them.

(6) The optical-recording-medium playback apparatus may further include a focal-position-adjusting unit which adjusts a focal position of the light focused by the optical head in the thickness direction of the optical recording medium.

In this case, the focal-position-adjusting unit may include an afocal optical system, a refractive-index-varying device, or wedge prisms.

(7) The optical-recording-medium playback apparatus may further include a pinhole which is disposed between the optical member and the light-receiving unit.

In such a case, the stray light, in particular, the returning light from the recording layers other than the one on which the light is focused can be removed from the light incident on the light-receiving unit.

The light-emitting unit, the pinhole, and the light-receiving unit may be integrally formed on a single substrate.

In such a case, problems regarding alignment, fixing, and displacements due to degradation over time between the light-emitting unit, the pinhole, and the light-receiving unit can be reduced.

The device in which the light-emitting unit, the pinhole, and the light-receiving unit are integrally formed on a single substrate can be manufactured by using, for example, semiconductor technology. In addition, the pinhole can be formed integrally with the light-receiving unit by restricting a light-receiving surface of the light-receiving unit.

(8) The optical-recording-medium playback apparatus may further include a detecting unit which detects at least one of the focus, tracking, and tilt states of the optical recording medium.

The focus, tracking, and tilt states correspond to a displacement of the focal position of the incident light with respect to the recording layer from which the information is read out in the depth direction, a displacement of the incident light with respect to the track of the recording layer, and the tilt of the incident light with respect to the optical recording medium, and can be output from the detecting unit as a focus error signal, a tracking error signal, and a tilt signal, respectively.

When the above-described detecting unit is provided, focus control, tracking control, and tilt control can be performed for each of the recording layers.

2B. According to another aspect of the present invention, an optical-recording-medium playback apparatus includes a light-emitting unit which emits light; a stage which retains an optical recording medium having a plurality of recording layers from which information can be optically read out; an optical head which focuses the light emitted from the light-emitting unit onto one of the recording layers of the optical recording medium, the optical head having a surface which faces a surface of the optical recording medium with a gap therebetween of less than the wavelength of the light emitted from the light-emitting unit; an optical member which focuses returning light which returns from the optical recording medium in response to the light focused by the optical head; and a light-receiving unit which receives the returning light focused by the optical member.

The optical recording medium is placed on the stage. Accordingly, the optical recording medium is not necessarily included in the optical-recording-medium playback apparatus as a component thereof, and can be detached from the optical-recording-medium playback apparatus.

Other components of this optical-recording-medium playback apparatus according to Item 2B are substantially similar to those of the optical-recording-medium playback apparatus according to Item 2A.

In order to attain the third object of the present invention, an optical-recording-medium playback apparatus according to the present invention is constructed as described below.

3A. An optical-recording-medium playback apparatus according to the present invention includes an optical recording medium having a plurality of recording layers from which information can be optically read out and a tracking layer on which a plurality of pits are arranged along tracks of the recording layers; a first light-emitting unit which emits light with a first wavelength; a second light-emitting unit which emits light with a second wavelength which is different from the first wavelength; an optical combiner which combines the light emitted from the first light-emitting unit and the light emitted from the second light-emitting unit; a first optical member which focuses the light combined by the optical combiner onto the optical recording medium, the light focused on the optical recording medium being reflected by the optical recording medium and passing again through the first optical member; a second optical member which focuses the light reflected by the optical recording medium and passing through the first optical member; a first light-receiving unit which receives light with the first wavelength included in the light focused by the second optical member; and a second light-receiving unit which receives light with the second wavelength included in the light focused by the second optical member.

As described above, the optical-recording-medium playback apparatus includes the optical recording medium having a plurality of recording layers from which information can be optically read out and the tracking layer on which a plurality of pits are arranged along the tracks of the recording layers.

Since tracking can be performed by using the pits formed on the tracking layer, it is not necessary to form a pattern or the like for tracking on the recording layers. Accordingly, the interval between the recording layers can be reduced.

In addition, the information readout operation and the generation and the generation of a tracking error signal can be performed by using a pair of the first light-emitting unit and the first light-receiving unit and a pair of the second light-emitting unit and the second light-receiving unit. Since the information readout operation and the generation of the tracking error signal can be performed by different pairs of the light-emitting units and the light-receiving units, the reliability of the optical-recording-medium playback apparatus can be increased.

(1) The pits on the adjacent tracks may be separated from each other by more than the shortest distance between the adjacent tracks.

When the pits on the adjacent tracks are separated from each other by more than the shortest distance between the adjacent tracks, distances between the adjacent pits can be increased. Accordingly, the pits on the adjacent tracks can be prevented from being placed within the focal spot of the light focused on the tracking layer at the same time, and tracking error signals obtained from a plurality of tracks can be prevented from being mixed. As a result, the interval between the tracks can be easily reduced and the recording density of the optical recording medium can be easily increased.

(2) The optical-recording-medium playback apparatus may further include a tilt adjusting unit which adjusts the tilt of the optical recording medium.

When the tilt of the optical recording medium is adjusted, the displacement between the tracks of the recording layers and the tracking layer can be reduced.

(3) The optical-recording-medium playback apparatus may further include a pinhole which is disposed between the second optical member and the first light-receiving unit.

In such a case, the stray light, in particular, light reflected by the recording layers other than the one from which information is read out, can be removed and the accuracy of the information readout operation can be increased.

The first light-emitting unit, the pinhole, and the first light-receiving unit may be integrally formed on a single substrate.

When these components are formed integrally, problems regarding alignment, fixing, and displacements due to degradation over time between them can be eliminated.

(4) The first optical member may have a surface which faces a surface of the optical recording medium with a gap of less than both the first wavelength and the second wavelength.

When the first optical member has a surface which is in the vicinity of the surface of optical recording medium, these surfaces can be connected to each other with evanescent light. As a result, the numerical aperture of the first optical member can be increased, and the information can be read out with high resolution. Accordingly, the recording density of the optical recording medium can be increased.

(5) The optical-recording-medium playback apparatus may further include an aberration correcting unit which corrects aberrations of the first optical member.

In such a case, the focusing performance at which the light is focused on the optical recording medium can be increased and high-resolution readout from the optical recording medium can be achieved.

(6) The optical-recording-medium playback apparatus may further include a focal-position-adjusting unit which adjusts a focal position of the light focused by the first optical member in the thickness direction of the optical recording medium.

In this case, the focal-position-adjusting unit may include an afocal optical system, a refractive-index-varying device, or wedge prisms.

3B. According to another aspect of the present invention, an optical-recording-medium playback apparatus includes a stage which retains an optical recording medium having a plurality of recording layers from which information can be optically read out and a tracking layer on which a plurality of pits are arranged along tracks of the recording layers; a first light-emitting unit which emits light with a first wavelength; a second light-emitting unit which emits light with a second wavelength which is different from the first wavelength; an optical combiner which combines the light emitted from the first light-emitting unit and the light emitted from the second light-emitting unit; a first optical member which focuses the light combined by the optical combiner onto the optical recording medium, the light focused on the optical recording medium being reflected by the optical recording medium and passing again through the first optical member; a second optical member which focuses the light reflected by the optical recording medium and passing through the first optical member; a first light-receiving unit which receives light with the first wavelength included in the light focused by the second optical member; and a second light-receiving unit which receives light with the second wavelength included in the light focused by the second optical member.

The optical recording medium is placed on the stage. Accordingly, the optical recording medium is not necessarily included in the optical-recording-medium playback apparatus as a component thereof, and can be detached from the optical-recording-medium playback apparatus.

(1) The pits on the adjacent tracks may be separated from each other by more than the shortest distance between the adjacent tracks.

When the pits on the adjacent tracks are separated from each other by more than the shortest distance between the adjacent tracks, distances between the adjacent pits can be increased. Accordingly, the pits on the adjacent tracks can be prevented from being placed within the focal spot of the light focused on the tracking layer at the same time, and tracking error signals obtained from a plurality of tracks can be prevented from being mixed. As a result, the interval between the tracks can be easily reduced and the recording density of the optical recording medium can be easily increased.

(2) The optical-recording-medium playback apparatus may further include a tilt adjusting unit which adjusts the tilt of the optical recording medium.

When the tilt of the optical recording medium is adjusted, the displacement between the tracks of the recording layers and the tracking layer can be reduced.

(3) The optical-recording-medium playback apparatus may further include a pinhole which is disposed between the second optical member and the first light-receiving unit.

In such a case, the stray light, in particular, light reflected by the recording layers other than the one from which information is read out, can be removed and the accuracy of the information readout operation can be increased.

The first light-emitting unit, the pinhole, and the first light-receiving unit may be integrally formed on a single substrate.

When these components are formed integrally, problems regarding alignment, fixing, and displacements due to degradation over time between them can be eliminated.

(4) The first optical member may have a surface which faces a surface of the optical recording medium with a gap of less than both the first wavelength and the second wavelength.

When the first optical member has a surface which is in the vicinity of the surface of optical recording medium, these surfaces can be connected to each other with evanescent light. As a result, the numerical aperture of the first optical member can be increased, and the information can be read out with high resolution. Accordingly, the recording density of the optical recording medium can be increased.

(5) The optical-recording-medium playback apparatus may further include an aberration correcting unit which corrects aberrations of the first optical member.

In such a case, the focusing performance at which the light is focused on the optical recording medium can be increased and high-resolution readout from the optical recording medium can be achieved.

(6) The optical-recording-medium playback apparatus may further include a focal-position-adjusting unit which adjusts a focal position of the light focused by the first optical member in the thickness direction of the optical recording medium.

In this case, the focal-position-adjusting unit may include an afocal optical system, a refractive-index-varying device, or wedge prisms.

3C. According to another aspect of the present invention, an optical recording medium includes a plurality of recording layers from which information can be optically read out and a tracking layer on which a plurality of pits are arranged along tracks of the recording layers. The pits on the adjacent tracks are separated from each other by more than the shortest distance between the adjacent tracks.

Since tracking can be performed by using the pits formed on the tracking layer, it is not necessary to form a pattern or the like for tracking on the recording layers. Accordingly, the interval between the recording layers can be reduced.

When the pits on the adjacent tracks are separated from each other by more than the shortest distance between the adjacent tracks, distances between the adjacent pits can be increased. Accordingly, the pits on the adjacent tracks can be prevented from being placed within the focal spot of the light focused on the tracking layer at the same time, and tracking error signals obtained from a plurality of tracks can be prevented from being mixed. As a result, the interval between the tracks can be easily reduced and the recording density of the optical recording medium can be easily increased.

The pits on the tracking layer may be arranged such that distances between the adjacent pits are at a maximum.

When the pits are arranged such that distances between the adjacent pits are at a maximum, the tracking error signal can be prevented from being mixed with those from the adjacent tracks.

DESCRIPTION OF THE PREFERRED EMBODIMENTS

Embodiments of the present invention will be described below with reference to the accompanying drawings.

First Embodiment

Figure 1:
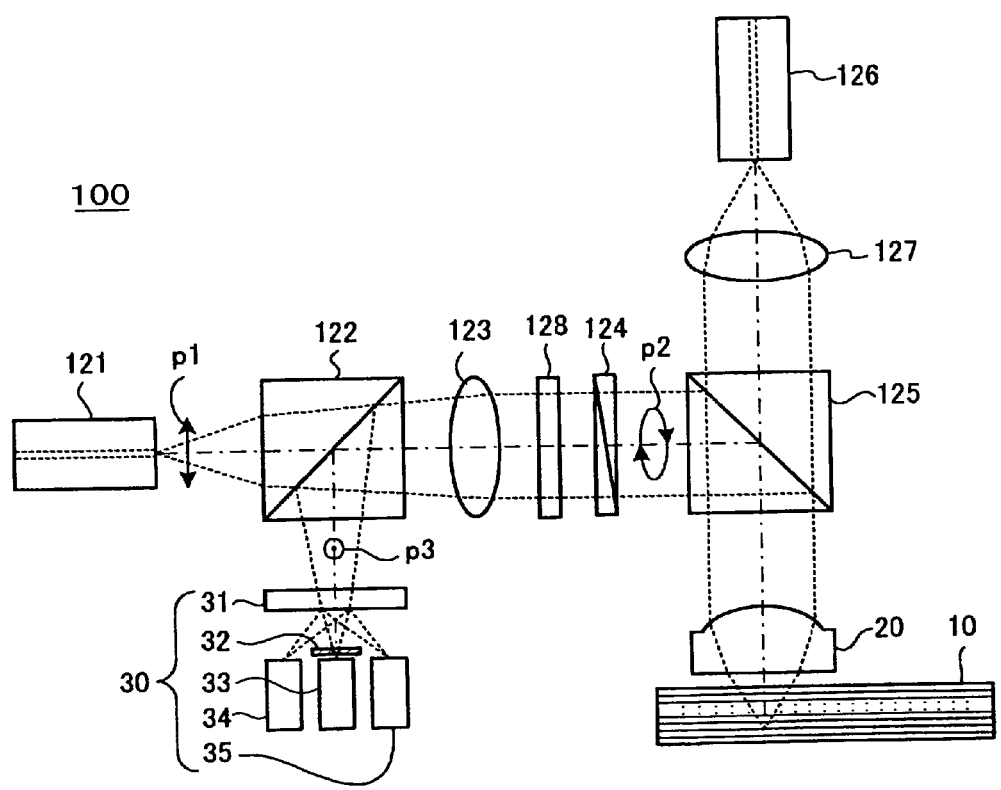
FIG. 1 is a schematic diagram showing the overall construction of an optical-recording-medium playback apparatus according to a first embodiment of the present invention.

FIG. 1 is a schematic diagram showing an optical-recording-medium playback apparatus 100 according to a first embodiment of the present invention. As shown in FIG. 1, the optical-recording-medium playback apparatus 100 includes an optical recording medium 10, a semiconductor laser diode (LD) 121, a polarization beam splitter (PBS) 122, a collimator focusing lens 123, a quarter-wavelength plate (QWP) 124, a dichroic combiner 125, a spherical aberration corrector 128, an objective lens 20, a light-receiving unit 30 (a holographic optical element (HOE) 31, a pinhole 32, and photodiodes (PDs) 33 to 35), a semiconductor laser diode (LD) 126, and a collimator lens 127.

In the optical-recording-medium playback apparatus 100, light incident on the photodiode 33 is restricted by the pinhole 32 so that stray light can be removed from the incident light. Thus, noise components can be removed from an information playback signal (a radio frequency (RF) signal described below).

(Detailed Description of Components of Optical-Recording-Medium Playback Apparatus)

Next, components of the optical-recording-medium playback apparatus 100 will be described in detail below.

First, the construction of the optical recording medium 10 will be described.

The optical recording medium 10 may be of a read-only type, a write-only type, or a rewritable type. Accordingly, the optical-recording-medium playback apparatus 100 may perform reading, writing, or rewriting on the optical recording medium 10 as necessary.

Figure 2A:
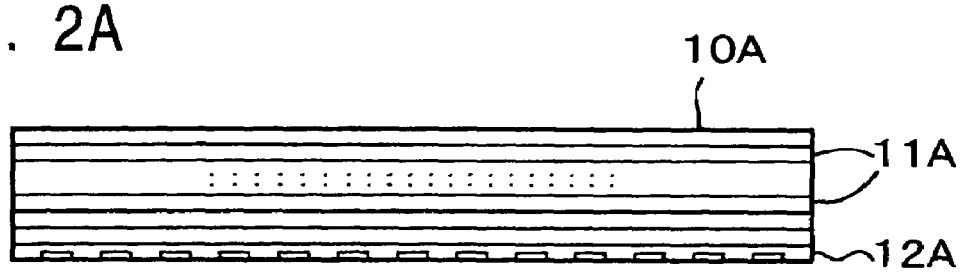
FIGS. 2A and 2B are enlarged sectional views showing examples of the construction of an optical recording medium.
Figure 2B:
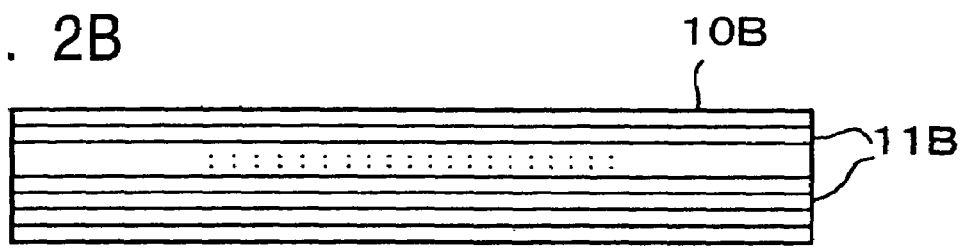

There are several types of optical recording media depending on how tracking is performed, and FIGS. 2A and 2B are enlarged sectional views showing optical recording media 10A and 10B, respectively, as examples of the construction of the optical recording medium 10.

The optical recording medium 10A includes a plurality of recording layers 11A and a groove layer 12A which is disposed at the bottom. In the optical recording medium 10A, information is recoded on the recording layers 11A such that it can be read out by optical means, and the groove layer 12A is provided with guide grooves used as a reference for tracking in an operation of reading out the information recorded on the recording layers 11A or a pattern (hereinafter referred to as a tracking pattern) which serves a similar purpose.

The optical recording medium 10B includes a plurality of recording layers 11B, but does have a layer which is exclusively used for tracking like the optical recording medium 10A. Instead, each of the recording layers 11B is provided with guide grooves used as a reference for tracking or a pattern which serves a similar purpose.

Either one of the optical recording media 10A and 10B may be used as the optical recording medium 10.

In order to read out information from the entire area of the optical recording medium 10, the optical-recording-medium playback apparatus 100 includes a scanning unit (not shown) for scanning the optical recording medium 10 with a light beam emitted from the semiconductor laser diode 121. Approximately the entire area of the optical recording medium 10 can be scanned with a light beam emitted from the objective lens 20 by, for example, rotating the optical recording medium 10 and moving the objective lens 20 in the radial direction of the optical recording medium 10 with respect to the rotational center of the optical recording medium 10.

In addition, the optical-recording-medium playback apparatus 100 includes a focus control unit (not shown) for focusing the light beam emitted from the objective lens 20 on each recording layer 11 of the optical recording medium 10. The recording layer 11 from which information is read out can be changed by the focus control unit. The detailed construction of the focus control unit will be described in another embodiment.

The semiconductor laser diode 121 is a light source for reading out information from the optical recording medium 10, and has a wavelength of, for example, 658 nm.

The polarization beam splitter 122 is an optical element which transmits light of a predetermined polarization and reflects light of a polarization orthogonal to the predetermined polarization (for example, it transmits P-polarized light and reflects S-polarized light).

The collimator focusing lens 123, which corresponds to a second optical member of the present invention, is an optical element which collimates light emitted from the semiconductor laser diode 121 and focuses light reflected by the optical recording medium 10 onto the photodiodes 33 to 35.

The quarter-wavelength plate 124 is an optical element which provides a phase difference of a quarter wavelength between orthogonally polarized light waves. In the present embodiment, the quarter-wavelength plate 124 is used to convert linearly polarized light to circularly polarized light, and vise versa.

The dichroic combiner 125 is an optical element which combines light waves with a plurality of wavelengths. In the present embodiment, the dichroic combiner 125 combines light emitted from the semiconductor laser diode 121 and light emitted from the semiconductor laser diode 126.

The spherical aberration corrector 128 is an optical element which corrects spherical aberration which occurs according to the position of each layer and causes light to be properly focused on one of the recording layers 11 of the optical recording medium 10. The spherical aberration corrector 128 may be constructed of, for example, a liquid crystal device. The effect of correcting the spherical aberration by the spherical aberration corrector 128 will be described below in a second embodiment.

The objective lens 20, which corresponds to a first optical member of the present invention, is an optical element which focuses light emitted from the semiconductor laser diodes 121 and 126 onto one of the recording layers 11 of the optical recording medium 10.

The numerical aperture of the objective lens 20 is preferably as high as possible. The reason for this will be described below.

Even if the objective lens 20 has no aberration, light do not converge to a single geometric point because of the wave nature of light, but converges to a pattern called an Airy disk. The radius of the Airy disk can be expressed as 0.61λ/NA, where λ is the wavelength and NA is the numerical aperture.

In order to increase the recording density (the amount of information which can be recorded in a unit area) of the optical recording medium 10, the diameter of the Airy disk is preferably as small as possible. This is the reason why the numerical aperture NA of the objective lens 20 is preferably as high as possible.

The following methods can be used for increasing the numerical aperture NA of the objective lens 20.

For example, the numerical aperture NA can be increased by using a lens with a small spherical aberration. In addition, a numerical aperture NA of one or more can be obtained and high-resolution readout can be achieved by applying a system which includes a solid immersion lens (SIL) to utilize evanescent light, which will be described below in other embodiments. More specifically, a flying optical head, which will be described below, can be used instead of the objective lens 20.

The semiconductor laser diode 126 is a light source for performing tracking of the optical recording medium 10, and has a wavelength of, for example, 780 nm.

The collimator lens 127 is an optical element which collimates a light beam emitted from the semiconductor laser diode 126.

The light-receiving unit 30 includes the holographic optical element 31, the pinhole 32, and the photodiodes 33 to 35.

The holographic optical element 31 diffracts light incident thereon from the polarization beam splitter 122 toward the photodiodes 33 to 35. A diffraction pattern for forming light beams with patterns suitable for generating a tracking error signal and a focus error signal is formed on the holographic optical element 31.

The pinhole 32 has a hole which corresponds to a focal point of light incident on the photodiode 33 from the holographic optical element 31. This hole only transmits light which passes through positions around the focal point and blocks the remaining light. The photodiode 33 detects signal light (light source of this light is the semiconductor laser diode 121).

The focal point of light focused on the optical recording medium 10 and that of light focused on the photodiode 33 correspond to each other. Therefore, by causing the light focused on the photodiode 33 to pass through the pinhole 32, stray light from positions around the focal point on the optical recording medium 10, that is, positions around the recording layer 11 from which information is read out (in particular, light reflected by the recording layers 11 other than the one from which information is read out) can be removed and the S/N ratio of the signal can be increased.

It is considered effective to set the diameter φ of the hole to, for example, about the diameter of the Airy disk (1.22λ/NA). The Airy disk of light focused on the photodiode 33 corresponds to that of light focused on one of the recording layers 11 of the optical recording medium 10. Accordingly, when only the light inside the Airy disk is allowed to pass through, it can be considered that the stray light is removed from light incident on the photodiode 33. When the diameter φ of the hole is too large relative to that of the Airy disk, the stray light included in light incident on the photodiode 33 increases. On the contrary, when the diameter φ of the hole is too small relative to that of the Airy disk, the intensity of light incident on the photodiode 33 decreases.

When, for example, the numerical aperture NA of light incident on the photodiode 33 (light returning from the optical recording medium 10), that is, the numerical aperture NA of the collimator focusing lens 123, is about 0.1 and the wavelength λ of the semiconductor laser diode 121 is 658 nm, the diameter φ of the hole is set to about 8 μm.

The photodiode 33 receives the light returning from the optical recording medium 10 (light source of this light is either one of the semiconductor laser diodes 121 and 126), and generates an RF signal representing the information recorded on the optical recording medium 10.

The photodiodes 34 and 35 receive the light returning from the optical recording medium 10 and generate the tracking error signal and the focus error signal regarding the optical recording medium 10. The photodiodes 34 and 35 are suitably segmented in accordance with the methods for detecting the error signals.

The tracking error signal is generated by using the light emitted from the semiconductor laser diode 126, and the focus error signal is generated by using the light emitted from the semiconductor laser diode 121.

(Operation of Optical-Recording-Medium Playback Apparatus)

Next, the operation of the optical-recording-medium playback apparatus 100 will be described below.

Linearly polarized light (polarization state is p1) for reading out information is emitted from the semiconductor laser diode 121, passes through the polarization beam splitter 122, and is collimated by the collimator focusing lens 123. The light collimated by the collimator focusing lens 123 passes through the spherical aberration corrector 128, is changed to circularly polarized light (polarization state is p2) by the quarter-wavelength plate 124, and is deflected by 90° by the dichroic combiner 125. The light deflected by the dichroic combiner 125 is incident on the objective lens 20, and is focused to a small spot on one of the recording layers 11 of the optical recording medium 10. At this time, the recording layer 11 on which the light is focused is selected by adjusting the position of the objective lens 20 along an optical axis, and information is read out (played back), recorded on, or deleted from the selected recording layer 11.

The polarization direction of the circularly polarized light is reversed when it is reflected by the optical recording medium 10, and the reflected light is collimated by the objective lens 20. The collimated light is deflected by 90° by the dichroic combiner 125, passes through the quarter-wavelength plate 124, where it is changed to linearly polarized light (polarization state is p3) whose polarization direction is perpendicular to that of the linearly polarized light which travels toward the optical recording medium 10, passes through the spherical aberration corrector 128, and is converted to light focused on the photodiodes 33 to 35 by the collimator focusing lens 123. Then, this light is reflected by the polarization beam splitter 122, passes through the holographic optical element 31 and the pinhole 32, and is focused on the photodiodes 33 to 35.

At this time, the stray light is removed as light incident on the photodiode 33 passes through the pinhole 32. As a result, the S/N ratio of the RF signal obtained by the photodiode 33 can be increased.

In addition, when the construction is such that the focus error signal is also obtained by the photodiode 33, not only the S/N ratio of the RF signal but also the S/N ratio of the focus error signal can be increased.

Light used for tracking is emitted from the semiconductor laser diode 126, collimated by the collimator lens 127, passes through the dichroic combiner 125, and is incident on the objective lens 20. Light emitted from the objective lens 20 is focused to a small spot on the tracking pattern on the optical recording medium 10 (the groove layer 12A of the optical recording medium 10A).

When the optical recording medium 10B shown in FIG. 2B which does not have a layer which is exclusively used for tracking (layer which corresponds to the groove layer 12A of the optical recording medium 10A) is used, the semiconductor laser diode 126, the collimator lens 127, and the dichroic combiner 125 may be omitted. In other words, the semiconductor laser diode 121 may be provided as the only light source in the optical-recording-medium playback apparatus 100. In such a case, the objective lens 20 is disposed directly behind the quarter wavelength plate 124, and light which passes through the objective lens 20 is focused on the optical recording medium 10B.

The light reflected by the optical recording medium 10 is collimated by the objective lens 20, is deflected by 90° by the dichroic combiner 125, passes through the quarter-wavelength plate 124, and is converted to light focused on the photodiodes 33 to 35 by the collimator focusing lens 123. Then, this light is reflected by the polarization beam splitter 122, passes through the holographic optical element 31 and is focused on the photodiodes 34 and 35. The tracking error signal is generated by calculating the outputs from the photodiodes 34 and 35.

Second Embodiment

Figure 3:
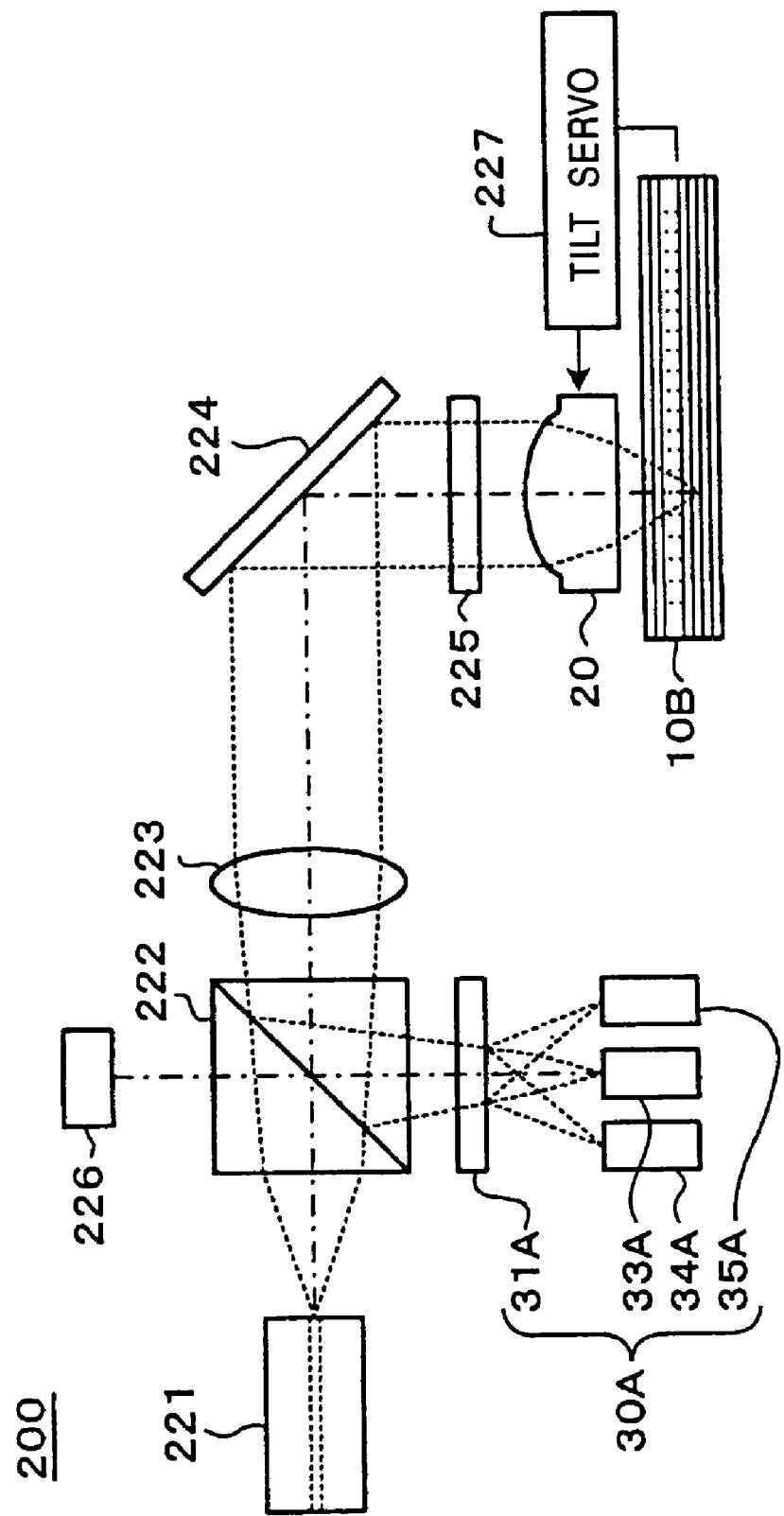
FIG. 3 is a schematic diagram showing the overall construction of an optical-recording-medium playback apparatus according to a second embodiment of the present invention.

FIG. 3 is a schematic diagram showing an optical-recording-medium playback apparatus 200 according to a second embodiment of the present invention. As shown in FIG. 3, the optical-recording-medium playback apparatus 200 includes an optical recording medium 10B, a pinhole-combined light-emitting/receiving device 221, a beam splitter 222, a collimator focusing lens 223, a mirror 224, a spherical aberration corrector 225, an objective lens 20, a light-receiving unit 30A (a holographic optical element 31A and photodiodes (PD) 33A to 35A), a monitor photodiode (PD) 226, and a tilt servo unit 227.

Light is emitted from the pinhole-combined light-emitting/receiving device 221 and is incident on the optical recording medium 10B via the beam splitter 222, the collimator focusing lens 223, the mirror 224, the spherical aberration corrector 225, and the objective lens 20.

Similar to the first embodiment, light is selectively focused on a desired recording layer by adjusting the position of the objective lens 20 along an optical axis, so that information can be recorded on or played back from the desired recording layer.

Light reflected by the optical recording medium 10B is incident on both the pinhole-combined light-emitting/receiving device 221 and the light-receiving unit 30A via the objective lens 20, the spherical aberration corrector 225, the mirror 224, the collimator focusing lens 223, and the beam splitter 222.

In the present embodiment, a semiconductor laser diode, a pinhole, and a photodiode are combined in the pinhole-combined light-emitting/receiving device 221. As described above in the first embodiment, the pinhole has a small diameter, such as 8 μm, and it is not easy to form a pinhole with such an extremely small hole, assemble it on a photodiode, and fix them with high precision. In addition, there is a possibility that the positional accuracy will be degraded over time. In particular, in an active optical system where the optical recording medium 10B is scanned with light, there is a large possibility that the degradation over time will be a problem.

According to the present embodiment, since the pinhole-combined light-emitting/receiving device 221 is used, the pinhole can be easily formed and assembled on the photodiode, and the degradation over time can be reduced.

Similar to the first embodiment, the optical-recording-medium playback apparatus 200 includes a scanning unit (not shown) for reading out information from the entire area of the optical recording medium 10B and a focus control unit (not shown) for focusing light emitted from the objective lens 20 on each recording layer 11B of the optical recording medium 10B.

As described above in the first embodiment, in the optical recording medium 10B, the tracking pattern used as a reference for tracking is formed on each of the recording layers 11B.

The pinhole-combined light-emitting/receiving device 221 includes a semiconductor laser diode which serves as a light source for reading out information from the optical recording medium 10B (the wavelength is, for example, 658 nm), a photodiode for receiving light returning from the optical recording medium 10B, and a pinhole for removing the stray light from light incident on the photodiode. The detailed construction of the pinhole-combined light-emitting/receiving device 221 will be described below.

The beam splitter 222 is an optical element which separates incident light into transmitted light and light deflected by 90° at a predetermined ratio.

The collimator focusing lens 223 is an optical element which collimates light emitted from the pinhole-combined light-emitting/receiving device 221 and focuses light reflected by the optical recording medium 10B onto the pinhole-combined light-emitting/receiving device 221 and the photodiodes 33A to 35A.

The objective lens 20 is an optical element which focuses light emitted from the pinhole-combined light-emitting/receiving device 221 onto one of the recording layers 11B of the optical recording medium 10B.

The mirror 224 is a reflective element for changing the direction of light (for deflecting light).

The spherical aberration corrector 225 is an optical element which corrects the spherical aberration which occurs according to the position of each layer and causes light to be properly focused on one of the recording layers 11B of the optical recording medium 10B. The spherical aberration corrector 225 may be constructed of, for example, a liquid crystal device.

The spherical aberration is a phenomenon in which a light beam emitted from a single point on an optical axis does not converge to a single point on the optical axis but is displaced along the optical axis after passing through a lens, and the amount of spherical aberration is defined by this displacement.

Spherical aberration will be described in more detail below with reference to FIGS. 4A and 4B.

Figure 4A:
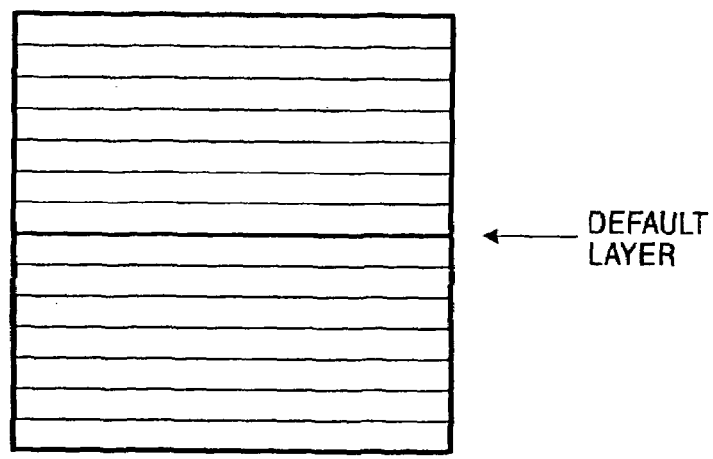
FIGS. 4A and 4B are explanatory diagrams of spherical aberration.

FIG. 4A is a side view showing a default layer included in the optical recording medium 10B. The default layer is set such that the spherical aberration is minimum at this layer. In this case, the distances between the default layer and the top and bottom surfaces are both set to 0.6 mm.

Figure 4B:
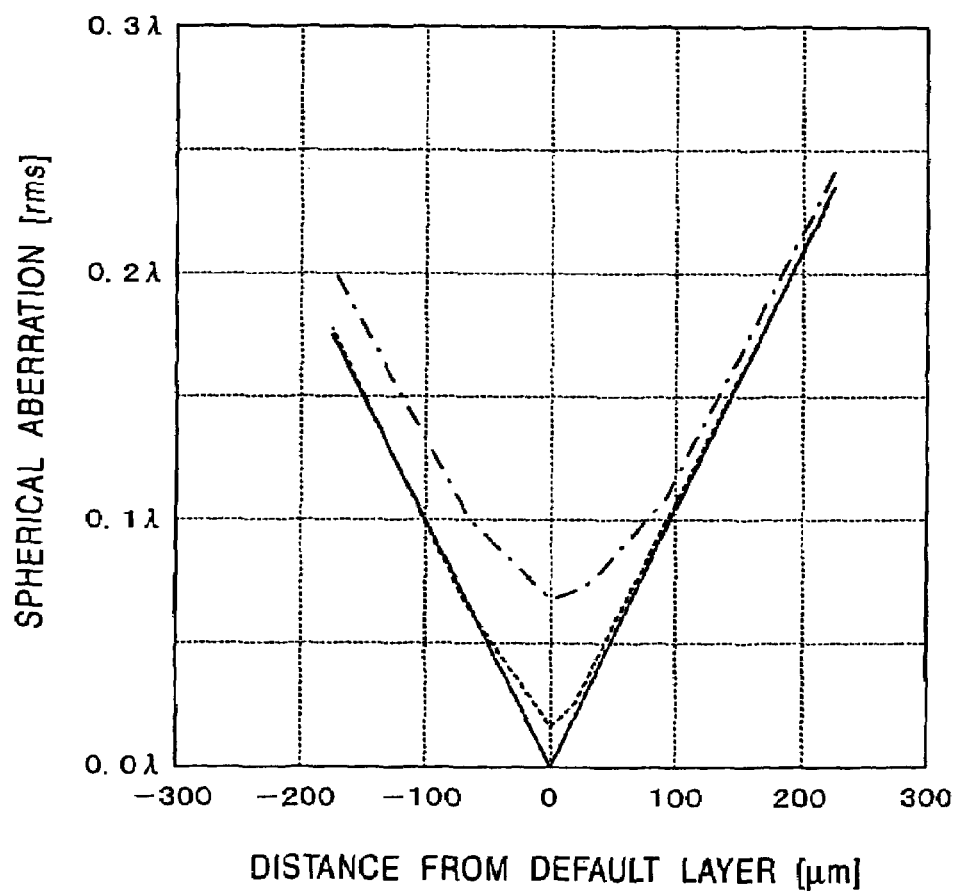

FIG. 4B is a graph showing the relationship between the focal position (distance from the default layer) and the amount of spherical aberration when the focal position of the objective lens 20 is adjusted to each recording layer 11B of the optical recording medium 10B shown in FIG. 4A. The graph shows the calculation results obtained under the following conditions: the numerical aperture NA is 0.6, the wavelength is 650 nm, and an inclination angle yan of incident collimated light is 0°, 0.6°, and 1.2°, the material of the optical recording medium 10B is polycarbonate, and the default layer is 0.6 mm away from both the top and bottom surfaces of the optical recording medium 10B. In the graph, the solid line, the chain line, and the dotted chain line correspond to the cases where the inclination yan of the optical recording medium 10B with respect to the optical axis of the incident light is 0°, 0.6°, and 1.2°, respectively.

With reference to FIG. 4B, the spherical aberration changes by ±0.2λ [rms] when the focal position is shifted upward or downward with respect to the default layer by ±0.2λ μm. The change in the spherical aberration around ±0.2λ [rms] can be corrected by using, for example, the above-described spherical aberration corrector constructed of a liquid crystal device.

When the interval between the recording layers 11B is about 20 μm to 25 μm, the distance of ±200 μm corresponds to about seven layers above and below the default layer (fifteen layers in total). Accordingly, readout from the optical recording medium 10B having at least about fifteen recording layers 11B can be achieved by using the spherical aberration corrector.

In the spherical aberration corrector constructed of a liquid crystal device, a spherical-aberration correction value can be changed in accordance with a voltage applied thereto. Accordingly, the spherical aberration can be accurately corrected in accordance with the focal position of the objective lens 20.

The holographic optical element 31A diffracts the light incident thereon from the beam splitter 222 with a hologram so as to separate the incident light into light components corresponding to a tracking error signal, a focus error signal, and a tilt detection signal, and focuses these light components onto the photodiodes 33A to 35A.

The photodiodes 34A and 35A receive light reflected by the optical recording medium 10B and generate the focus error signal used for adjusting the focal position on the optical recording medium 10B and the tracking error signal used for performing tracking on the optical recording medium 10B.

The focus error signal may be generated by any method as long as it can be obtained by forming a predetermined pattern on the holographic optical element 31A, and a knife-edge method, for example, is used. In the knife-edge method, a knife-edge is provided for asymmetrically blocking a part of light reflected by the optical recording medium 10B, and the focus error signal is obtained as a difference between the outputs from the photodiodes 34A and 35A.

Although the absolute intensity of the focus error signal differs between the recording layers 11B, as described below, the focus error signal can be generated by using a DC level corresponding to each recording layer 11B as a reference.

The tracking error signal may be generated by any method as long as it can be obtained by forming a predetermined pattern on the holographic optical element 31A, and a differential push-pull method, for example, is used. The tracking error signal is generated by using light reflected by the tracking pattern formed on the recording layers 11B and calculating the outputs from the photodiodes 34A and 35A on the basis of the differential push-pull method. The tracking control (tracking servo) of the optical recording medium 10B is performed on the basis of the tracking error signal.

The tracking error signal may also be obtained by a differential phase detection (DPD) method. In the DPD method, pits of the tracking pattern are required to have a certain depth, such as about λ/4, and there is a disadvantage in that it is difficult to increase the number of the recording layers 11B. Therefore, the push-pull method is used in the present embodiment. However, this is simply because the recording layers 11B can be manufactured easily, and it does not deny the use of the DPD method.

In addition, in the case in which pits are used for detecting tilt, as described below, the tracking error signal may also be generated by a sample servo method, which is advantageous in view of the manufacturing efficiency of the optical recording medium 10B.

The monitor PD 226 is a photodiode for monitoring the intensity of light emitted from the pinhole-combined light-emitting/receiving device 221, and is used for maintaining the intensity of the emitted light constant.

The tilt servo (skew servo) unit 227 is an adjusting mechanism which adjusts light incident on the optical recording medium 10B from the objective lens 20 to be perpendicular to the optical recording medium 10B on the basis of the result of tilt detection (tilt and skew of the optical recording medium 10B with respect to an optical axis of the light incident on the optical recording medium 10B). Although the optical recording medium 10B is used in the present embodiment, the tilt servo unit 227 is particularly necessary when the optical recording medium 10A shown in FIG. 2A is used.

Figure 5A:
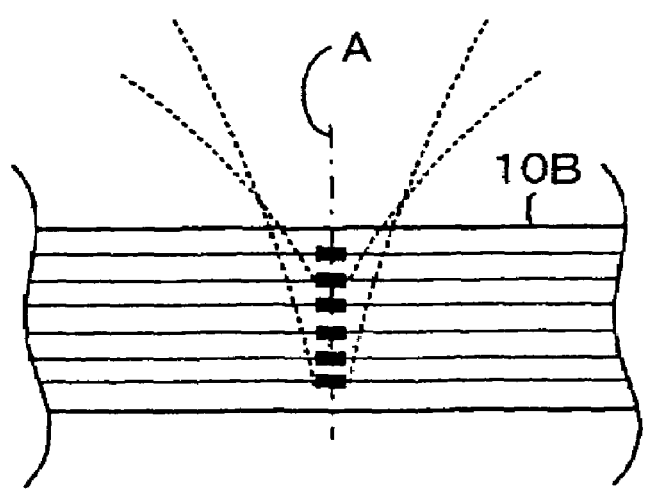
FIGS. 5A and 5B are diagrams showing the manner in which an information readout position is shifted in each recording layer when the optical recording medium tilts with respect to an optical axis of incident light.
Figure 5B:
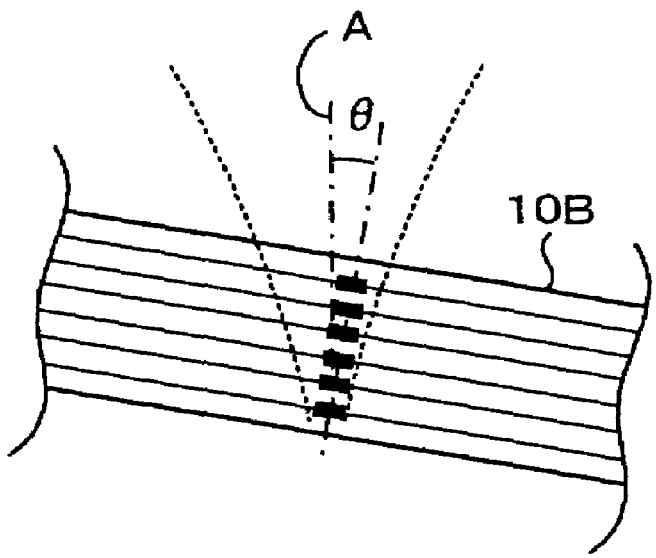

Since the optical recording medium 10B includes a plurality of recording layers 11B, when the optical recording medium 10B tilts with respect to the optical axis of the incident light, an information readout position is shifted in each of the recording layers 11B. This will be explained in more detail below with reference FIGS. 5A and 5B. FIG. 5A shows a state in which the surface of the optical recording medium 10B is perpendicular to the optical axis A of the incident light (no tilt), and FIG. 5B shows a state in which the surface of the optical recording medium 10B is tilted by an angle θ with respect to the optical axis A of the incident light.

In FIG. 5A, pits provided on the recording layers 11B at the same position in a plan view of the optical recording medium 10B can all be read out by the incident light with the optical axis A. Therefore, an information readout operation can be performed while tracking servo control is reliably performed. On the contrary, in FIG. 5B, the pits on the recording layers 11B at the same position in a plan view cannot be read out by the incident light with the optical axis A. More specifically, a displacement (a tracking offset which is different for each recording layer 11B) occurs in each of the recording layers 11B in accordance with the tilt angle θ of the optical recording medium 10B. In this case, an information playback signal cannot be accurately generated.

The tilt servo unit 227 is used for correcting the above-described tilt of the optical recording medium 10B by adjusting the tilt of the objective lens 20 or the optical recording medium 10B.

The tilt and skew of the optical recording medium 10B are detected by, for example, forming pits which serve as a reference for tilt detection on the recording layers 11B at the same position in a plan view (a method proposed by the Advanced Storage Magneto Optical (ASMO) consortium). The angle of the optical axis of the incidence light with respect to the optical recording medium 10B is adjusted such that the reference pits are aligned on the optical axis (see FIG. 5A).

Alternatively, the tilt may also be detected by a known method which utilizes the displacement of the reflected light which occurs in accordance with the tilt of the optical recording medium 10B (a method in which the movement of the reflected light is determined by differential detection using a tilt sensor), a method used in DVD-RAM technology, a method using coma aberration, etc.

Although the case in which the tilt servo control is performed is described above, it is not always necessary to perform the tilt servo control in the present embodiment, and the tilt servo unit 227 may also be omitted. This is because since the optical recording medium 10B shown in FIG. 2B in which each recording layer 11B has a tracking pattern is used in the present embodiment, tracking can be performed for each recording layer 11B. Thus, the tilt of the optical recording medium 10B with respect to the optical axis of the incident light is not a large problem. Accordingly, tilt servo control is not necessary unless the focusing performance is greatly degraded.

In the case in which the tilt servo control is omitted, the numerical aperture NA of the objective lens 20 is preferably relatively low since large astigmatism and coma aberration occur due to the tilt.

Figure 6:
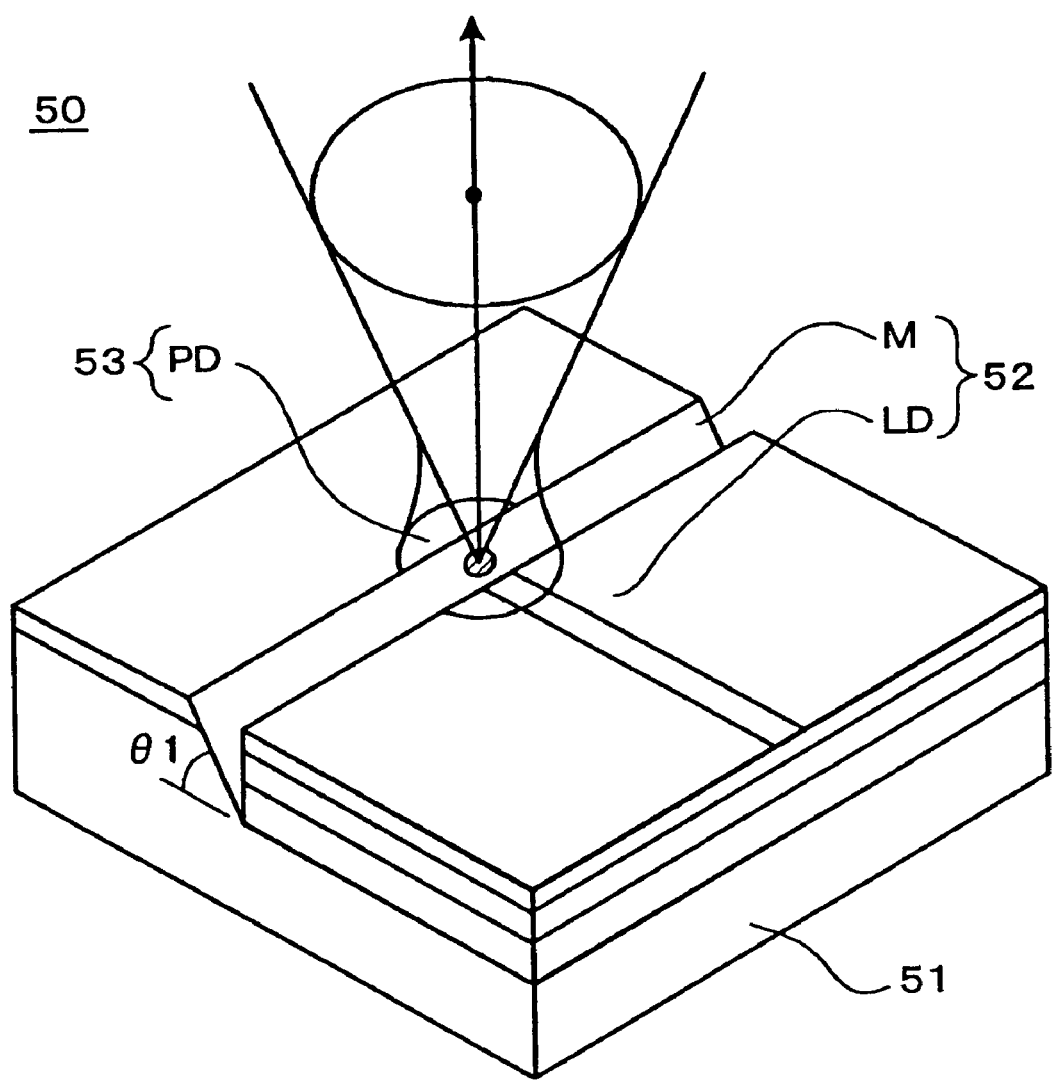
FIG. 6 is a perspective view showing a confocal laser coupler as an example of a pinhole-combined light-emitting/receiving device.

FIG. 6 is a perspective view showing a confocal laser coupler (CLC) 50 as an example of the pinhole-combined light-emitting/receiving device 221.

The confocal laser coupler 50 includes a light-emitting unit 52 and a light-receiving unit 53 which are arranged on the semiconductor substrate 51. The light-emitting unit 52 includes a semiconductor laser diode LD with a wavelength of, for example, 658 nm, in which a cavity direction extends along the surface of the semiconductor substrate 51 and a reflective mirror M which faces the emission surface of the semiconductor laser diode LD. The light-receiving unit 53 includes a photodiode PD which faces the semiconductor laser diode LD across the reflective mirror M.

θ1 is the angle at which the reflective mirror M is inclined, and is set in accordance with the material and crystal orientation of the semiconductor substrate 51. For example, when the semiconductor substrate 51 has a GaAs (0 1 -1) surface and the reflective surface is a (111)B surface, θ1 can be set to 54.7°.

The light-receiving unit 53 is placed at a position where light emitted from the light-emitting unit 52 and reflected by the optical recording medium 10B is focused by the collimator focusing lens 223 (confocal point). Since the light-emitting unit 52 and the light-receiving unit 53 are in the vicinity of each other, when light emitted from the light-emitting unit 52 returns along the same path in the opposite direction, the returning light is incident on the light-receiving unit 53. The distance between the light-emitting unit 52 and the light-receiving unit 53 is set to, for example, the diameter of the Airy disk (1.22λ/NA), which is the diffraction limit.

In addition, by reducing the size of a light-receiving surface of the light-receiving unit 53, the stray light can be removed substantially similarly to the case in which the pinhole is provided separately. More specifically, the light-receiving unit 53 is substantially combined with a pinhole by setting the size of the light-receiving surface to the size of the pinhole which is described above in the first embodiment (for example, to the size of the Airy disk).

As described above, in the confocal laser coupler 50, the light-receiving unit 53 which is spatially restricted within the size similar to that of the Airy disk (the light-receiving unit 53 whose size is similar to that of the Airy disk) is formed in the vicinity of the light-emitting unit 52 (light-emitting point).

Accordingly, light reflected by the recording layer 11B on which the light is focused reliably returns to the light-receiving unit 53. Thus, when the light emitted from the confocal laser coupler 50 is simply focused on a desired recording layer 11B, light reflected by this recording layer 11B can be incident on the light-receiving unit 53, and it is not necessary to adjust the position (perform alignment) of the position of the light-receiving unit 53. As a result, the signal from the recording layer 11B on which the light is focused can be reliably obtained. This also provides an advantage that the influence of the movement, etc., of the field of view of the objective lens 20 can be reduced.

Accordingly, even in an active operating environment in which the optical recording medium 10B is scanned by using the optical-recording-medium playback apparatus 200, the confocal system can be maintained (light can be incident on the light-receiving unit 53) while the focus servo control for focusing light on a desired recording layer 11B is being performed.

In addition, the light-receiving unit 53 is constructed of a pinhole-size photodiode formed by a semiconductor process or the like, and is thus combined with a pinhole. Accordingly, the displacement between the pinhole and the photodiode can be prevented and the degradation over time will not be a problem.

Figure 7A:
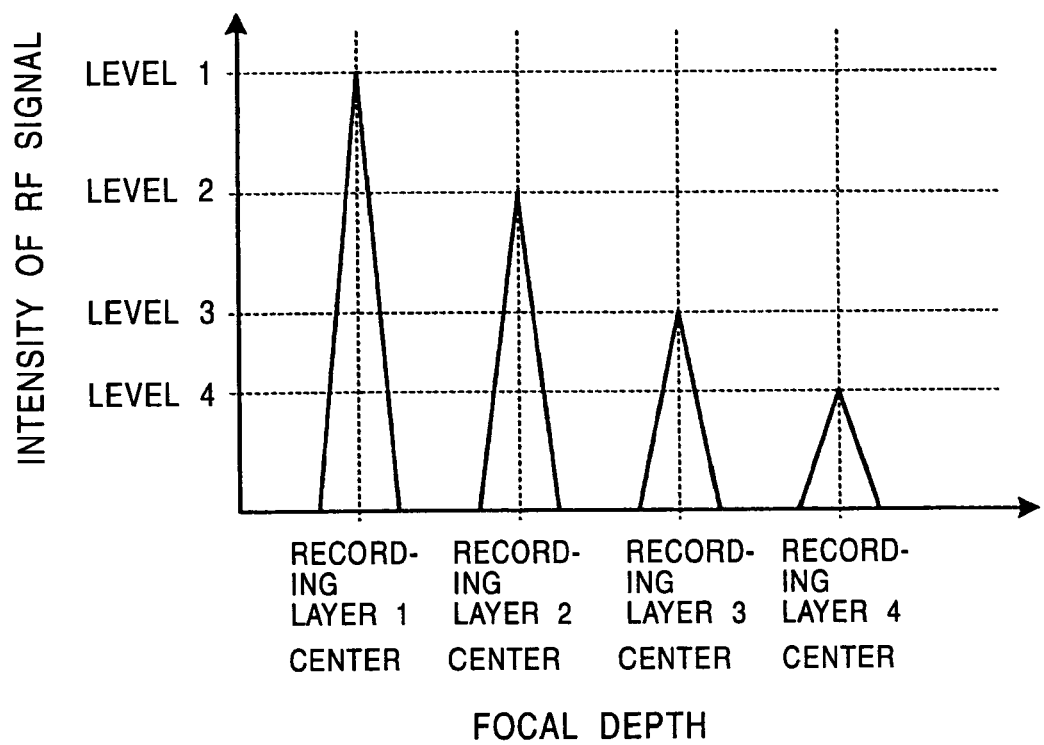
FIGS. 7A and 7B are graphs showing the relationship between a focal depth and an RF signal and the relationship between the focal depth and a focus error signal, respectively, obtained when the optical recording medium is played back by the optical-recording-medium playback apparatus.
Figure 7B:
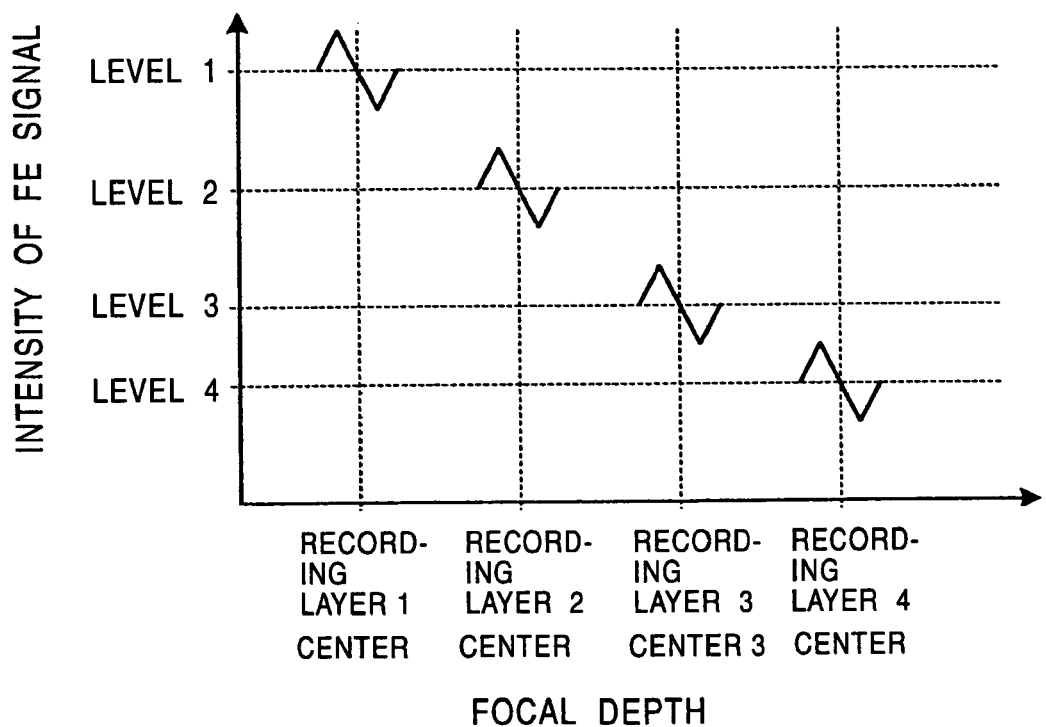

FIGS. 7A and 7B are graphs showing the relationship between the focal depth and the RF signal and the relationship between the focal depth and the focus error (FE) signal, respectively, obtained when the optical recording medium 10B is played back by using the optical-recording-medium playback apparatus 200. The intensity of the RF signal is at a maximum when the focal position along the optical axis is set to the center of each layer, and the intensity of the focus error signal increases or decreases when the focal position is shifted from the center of each layer.

According to the present embodiment, the confocal laser coupler 50 only outputs the RF signal, and the focus error signal and the tracking error signal are generated by the photodiodes 33A to 35A. This is because the structure of the confocal laser coupler 50 can be simplified and the manufacturing yield can be increased in such a case.

However, the construction of the confocal laser coupler may also be such that the focus error signal and the tracking error signal are also generated from the outputs of the confocal laser coupler, as described below.

Third Embodiment

Figure 8:
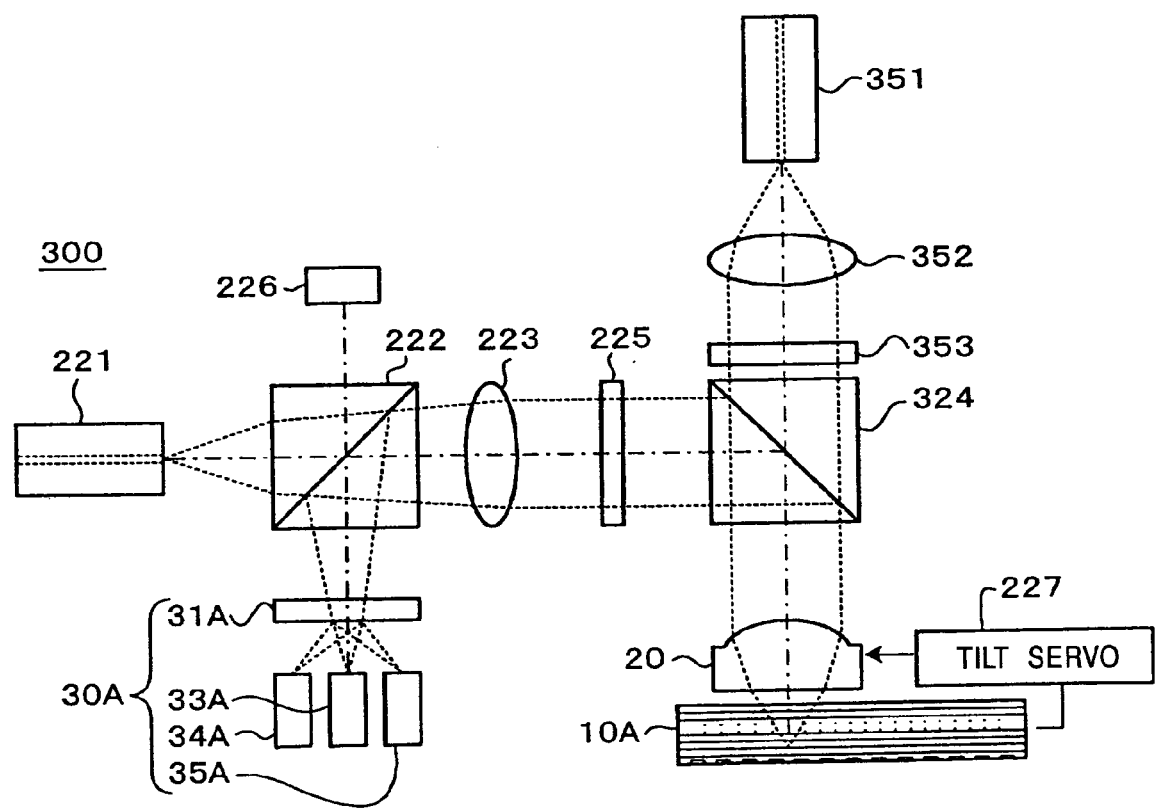
FIG. 8 is a schematic diagram showing the overall construction of an optical-recording-medium playback apparatus according to a third embodiment of the present invention.

FIG. 8 is a schematic diagram showing an optical-recording-medium playback apparatus 300 according to a third embodiment of the present invention. As shown in FIG. 8, the optical-recording-medium playback apparatus 300 includes an optical recording medium 10A, a pinhole-combined light-emitting/receiving device 221, a beam splitter 222, a collimator focusing lens 223, a dichroic combiner 324, a spherical aberration corrector 225, an objective lens 20, a light-receiving unit 30A (a holographic optical element 31A and photodiodes (PD) 33A to 35A), a monitor photodiode (PD) 226, and a tilt servo unit 227.

In addition, the optical-recording-medium playback apparatus 300 further includes a semiconductor laser diode (LD) 351, a collimator lens 352, and a spherical aberration corrector 353, and the optical-recording-medium playback apparatus 300 differs from the optical-recording-medium playback apparatus 200 of the second embodiment on this point. Thus, the optical-recording-medium playback apparatus 300 includes the dichroic combiner 324 in place of the mirror 224 of the optical-recording-medium playback apparatus 200.

In addition, in the present embodiment, the optical recording medium 10A having recording layers 11A which are free from the tracking pattern and a groove layer 12A which is exclusively used for tracking is used as the optical recording medium 10.

In the optical-recording-medium playback apparatus 300, light is emitted from the pinhole-combined light-emitting/receiving device 221 and is incident on the optical recording medium 10A via the beam splitter 222, the collimator focusing lens 223, the spherical aberration corrector 225, the dichroic combiner 324, and the objective lens 20. The light is reflected by the recording layers 11A of the optical recording medium 10A and is incident on both the pinhole-combined light-emitting/receiving device 221 and the light-receiving unit 30A via the objective lens 20, the dichroic combiner 324, the spherical aberration corrector 225, the collimator focusing lens 223, and the beam splitter 222.

In addition, light emitted from the semiconductor laser diode 351 is incident on the optical recording medium 10A via the collimator lens 352, the spherical-aberration correcting element 353, the dichroic combiner 324, and the objective lens 20. The light is reflected by the groove layer 12A of the optical recording medium 10 and is incident on the light-receiving unit 30A via the objective lens 20, the dichroic combiner 324, the collimator focusing lens 223, and the beam splitter 222.

In the second embodiment, light emitted from the pinhole-combined light-emitting/receiving device 221 is used for generating all of the RF signal, the focus error signal, and the tracking error signal, and for performing tilt detection.

In the third embodiment, light emitted from the pinhole-combined light-emitting/receiving device 221 is used for generating the RF signal and the focus error signal, and light emitted from the semiconductor laser diode 351 is used for generating the tracking error signal and for performing tilt detection. The wavelengths of the pinhole-combined light-emitting/receiving device 221 and the laser diode 351 may be, for example, 658 nm and 780 nm, respectively.

Accordingly, since the tracking error signal is generated by using the tracking pattern and a light source (semiconductor laser diode 351) other than the light source used for generating the RF signal, tracking can be more reliably performed.

In the present embodiment, since the tracking pattern is not formed on each of the recording layers 11A, tilt servo control cannot be omitted.

The present embodiment is substantially similar to the second embodiment with regard to other points, and explanations thereof are thus omitted.

Fourth Embodiment

According to a fourth embodiment of the present invention, an optical-recording-medium playback apparatus includes a pinhole-combined light-emitting/receiving device which can generate a tracking error signal. The overall construction of the optical-recording-medium playback apparatus according to the fourth embodiment is similar to that shown in FIG. 3 except for the construction of the pinhole-combined light-emitting/receiving device 221.

In the present embodiment, the focus error signal and the tracking error signal can be generated by the pinhole-combined light-emitting/receiving device 221. Accordingly, the light-receiving unit 30A can be omitted.

Figure 9:
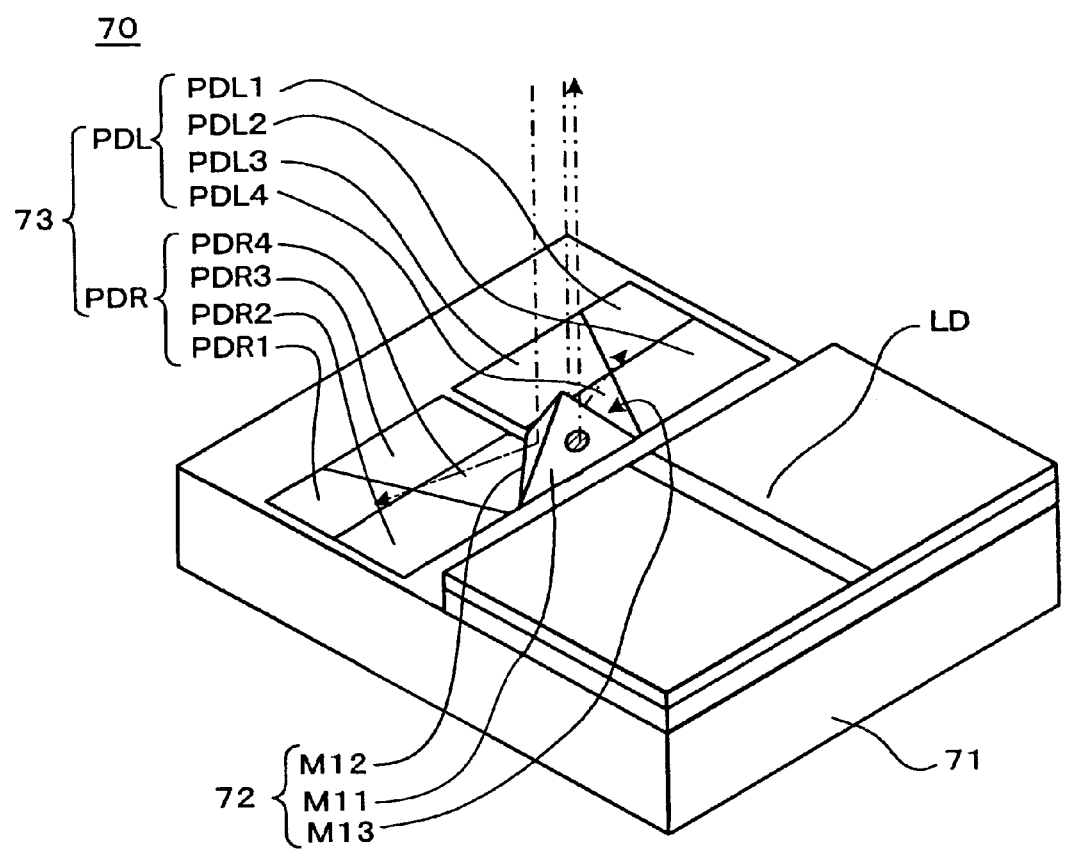
FIG. 9 is a perspective view showing a confocal laser coupler according to a fourth embodiment of the present invention.

FIG. 9 is a perspective view showing a confocal laser coupler (CLC) 70 as an example of the pinhole-combined light-emitting/receiving device 221 according to the present embodiment.

With reference to FIG. 9, the confocal laser coupler 70 includes a semiconductor laser diode LD, a triangular-pyramidal semiconductor structure 72 having three reflective mirrors $M_{11}$, $M_{12}$, and $M_{13}$, and a light-receiving unit 73 having two four-quadrant photodiodes $PD_R$ ($PD_{R1}$, $PD_{R2}$, $PD_{R3}$, and $PDR_4$) and $PD_L$ ($PD_{L1}$, $PD_{L2}$, $PD_{L3}$, and $PD_{L4}$) which are arranged on a semiconductor substrate 71.

Each of the two four-quadrant photodiodes $PD_R$ and $PD_L$ is divided into four segments by two orthogonal lines.

The reflective mirror $M_{11}$ faces the emission surface of the semiconductor laser diode LD and reflects light emitted from the semiconductor laser diode LD.

The light reflected by the reflective mirror $M_{11}$ is focused on the optical recording medium 10 by the objective lens 20, is reflected by the optical recording medium 10, is focused by the collimator focusing lens 223, and thus returns to the confocal laser coupler 70.

Light returning from the optical recording medium 10 is reflected by the reflective mirrors $M_{12}$ and $M_{13}$ and is incident on the four-quadrant photodiodes $PD_R$ and $PD_L$.

The focus error signal and the tracking error signal can be generated by calculating signals obtained from the segments $PD_{R1}$ to $PD_{R4}$ and $PD_{L1}$ to $PD_{L4}$ of the four-quadrant photodiodes $PD_R$ and $PD_L$. In addition, the RF signal can be obtained as the sum of the signals obtained from the segments $PD_{R1}$ to $PD_{R4}$ and $PD_{L1}$ to $PD_{L4}$.

By forming the semiconductor structure 72 with a size similar to that of the Airy disk, whose diameter is $1.22\lambda/NA$, the semiconductor structure 72 functions similarly to the pinhole.

Fifth Embodiment

According to a fifth embodiment of the present invention, an optical-recording-medium playback apparatus includes a flying optical head 80 in place of the objective lens 20. The overall construction of the optical-recording-medium playback apparatus according to the fifth embodiment is similar to that described in the second or third embodiment, and explanations thereof are thus omitted.

Figure 10:
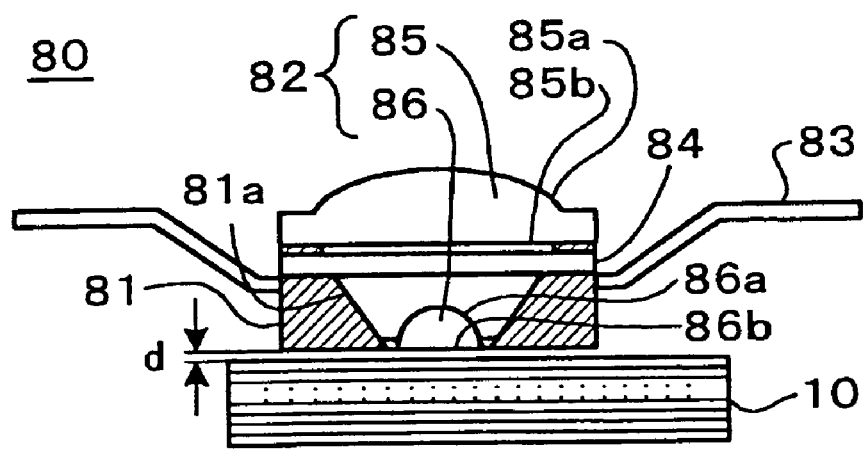
FIG. 10 is a schematic diagram showing an example of a flying optical head.

FIG. 10 is a schematic diagram showing the construction of the flying optical head 80. The flying optical head 80 performs an information readout/recording operation of the optical recording medium 10 by utilizing near-field optical effects, and includes a slider member 81, a two-piece lens 82, a suspension 83, and a focus control mechanism 84, as shown in FIG. 10.

Similar to head sliders used in hard disk drives or the like, the slider member 81 is supported by the suspension 83 such that it faces the optical recording medium 10. Accordingly, in the information readout/recording operation of the optical recording medium 10, the slider member 81 receives an air flow which occurs between the slider member 81 and the optical recording medium 10 due to the rotation, etc., of the optical recording medium 10 and flies above the optical recording medium 10 at a height of about 50 nm to 100 nm (gap d).

The slider member 81 has a hole 81a which extends through the slider member 81 in the thickness direction thereof at a predetermined position, and the two-piece lens 82 is disposed inside the hole 81a.

The two-piece lens 82 includes an objective lens 85 and a solid immersion lens (SIL) 86, and provides a numerical aperture NA of one or more.

The objective lens 85 is disposed closer to the light source than the solid immersion lens 86, and has a first surface 85a, which is a spherical or aspherical convex surface, and a second surface 85b, which is a spherical or aspherical surface.

The solid immersion lens 86 faces the optical recording medium 10, and has a third surface 86a, which is a spherical or aspherical convex surface that faces the objective lens 85, and a fourth surface 86b, which is approximately flat.

In the solid immersion lens 86, evanescent light is utilized which is generated between the fourth surface 86b of the solid immersion lens 86 and the optical recording medium 10 due to near-field optical effects when the fourth surface 86b is in the vicinity of the optical recording medium 10. When the gap d between the fourth surface 86b of the solid immersion lens 86 and the optical recording medium 10 is set to about 100 nm, the numerical aperture can be increased to one or more and high-resolution readout from the optical recording medium 10 can be achieved.

When the fourth surface 86b is in the vicinity of the optical recording medium 10, light travels between the fourth surface 86b and the optical recording medium 10 as evanescent light. Accordingly, light which passes through the air layer between the fourth surface 86b and the optical recording medium 10 is not influenced by the refractive index of the air layer. Thus, a medium through which the light travels is substantially only the solid immersion lens 86. Since the numerical aperture NA is proportional to the refractive index n of the medium and the refractive index n of the solid immersion lens 86 is greater than the refractive index of the air layer (n0=1), the numerical aperture NA increases.

A suspension 83 serves to maintain the flying height of the slider member 81 at an adequate height due to its own elasticity, or due to the elasticity of an elastic suspension spring provided thereon.

The focus control mechanism 84 may be, for example, a refractive-index-varying device whose refractive index varies in accordance with a voltage applied. The refractive-index-varying device may be constructed of, for example, an optical crystal device or a liquid crystal device. Since the length of the optical path changes along with the refractive index, the focal position can be adjusted. Accordingly, the recording layer 11 on which the light is focused can be selected.

In addition, the focal point can also be adjusted to an optimum position for each recording layer 11 by controlling the focal position on the basis of the focus error signal.

Light incident on the objective lens 85 passes through the objective lens 85, the focus control mechanism 84, the solid immersion lens 86, the flying optical head 80, and the air layer (gap d) between the flying optical head 80 and the optical recording medium 10, and is incident on the recording layers 11 of the optical recording medium 10. The light is reflected by the recording layers 11, travels along the same path in the opposite direction and, is emitted from the objective lens 85 as the returning light.

The spherical aberration which occurs according to the position of each recording layer 11 is corrected by the above-described spherical aberration corrector 225.

Due to the above-described focus control and aberration correction, readout/recording of information can be achieved by accurately focusing light on the desired recording layer 11.

According to the present embodiment, a numerical aperture NA of one or more can be obtained by utilizing near-field optical effects, and high-resolution readout/recording of the optical recording medium 10 can be achieved. In other words, the capacity of the optical recording medium 10 can be increased.

The focus control mechanism 84 may also be realized by means other than the refractive-index-varying device.

Figure 11:
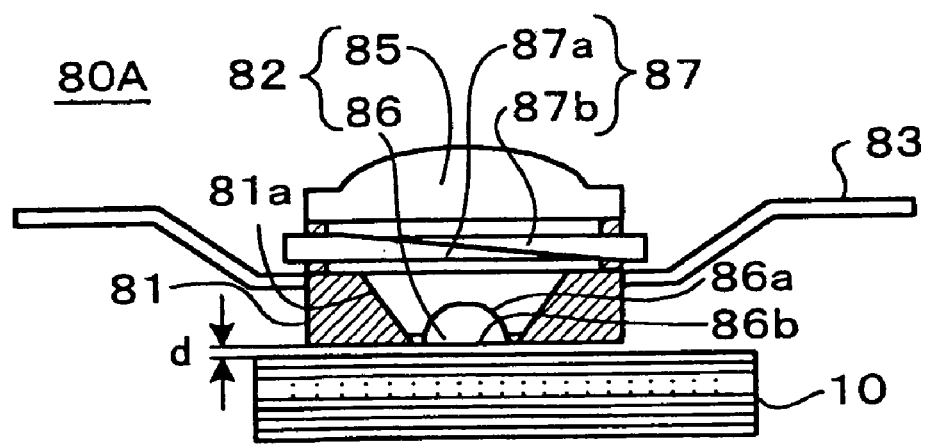
FIG. 11 is a schematic diagram showing another example of a flying optical head.

FIG. 11 is a schematic diagram showing the construction of a flying optical head 80A in which the focus control mechanism is constructed of a pair of wedge prisms 87a and 87b.

The wedge prisms 87a and 87b overlap each other in the vertical direction so as to form a plate-shaped member 87. The thickness of this plate-shaped member 87 can be adjusted by changing the positional relationship between the wedge prisms 87a and 87b. When the thickness of the plate-shaped member 87 changes, the length of the optical path in the plate-shaped member 87 changes accordingly. Accordingly, the focal position can be adjusted by moving one or both of the wedge prisms 87a and 87b.

The focus control mechanism 84 may also be provided separately from the flying optical head 80.

Figure 12:
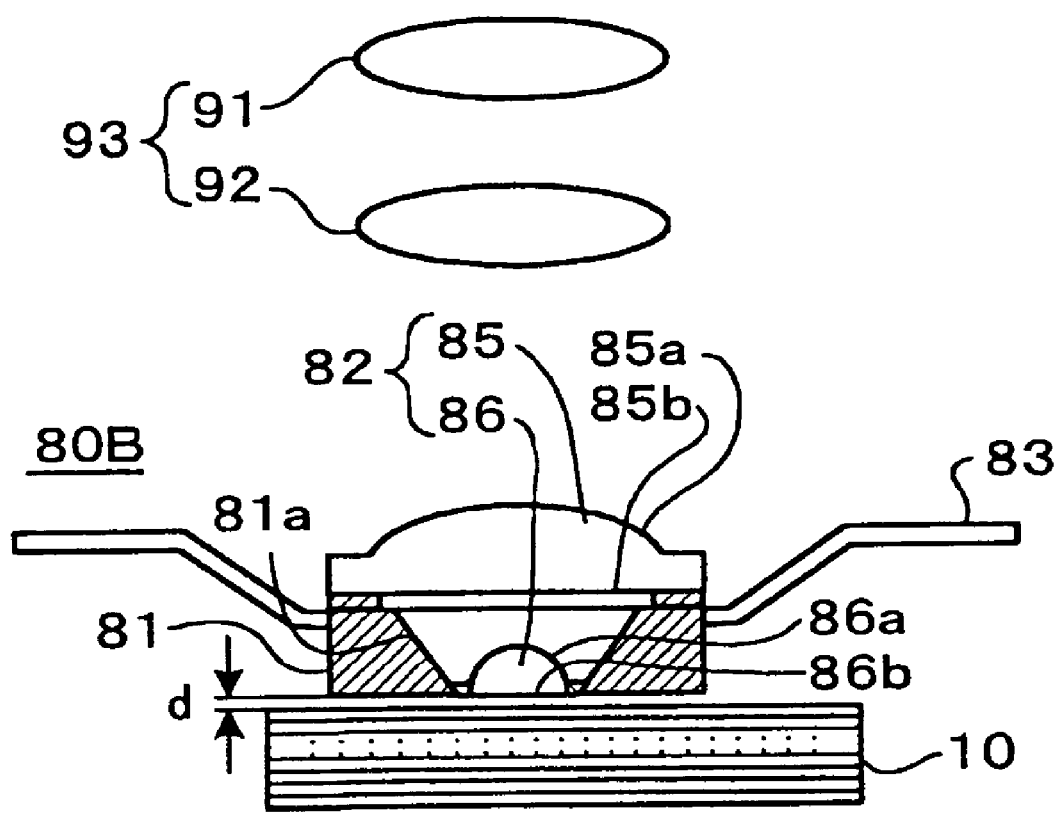
FIG. 12 is a schematic diagram showing another example of a flying optical head in which the focal position is adjusted by using an afocal optical system.

FIG. 12 is a schematic diagram showing an example in which the focal position is adjusted by an afocal optical system 93 including a pair of lenses 91 and 92. Thus, a flying optical head 80B shown in FIG. 12 does not include a focus control mechanism. Instead, the focal position is adjusted by the afocal optical system 93 incorporated in the optical system of the optical-recording-medium playback apparatus according to the present embodiment. The incidence angle of light incident on the objective lens 85 is slightly changed by changing the distance between the lenses 91 and 92, and thereby the focal position is adjusted.

Figure 13:
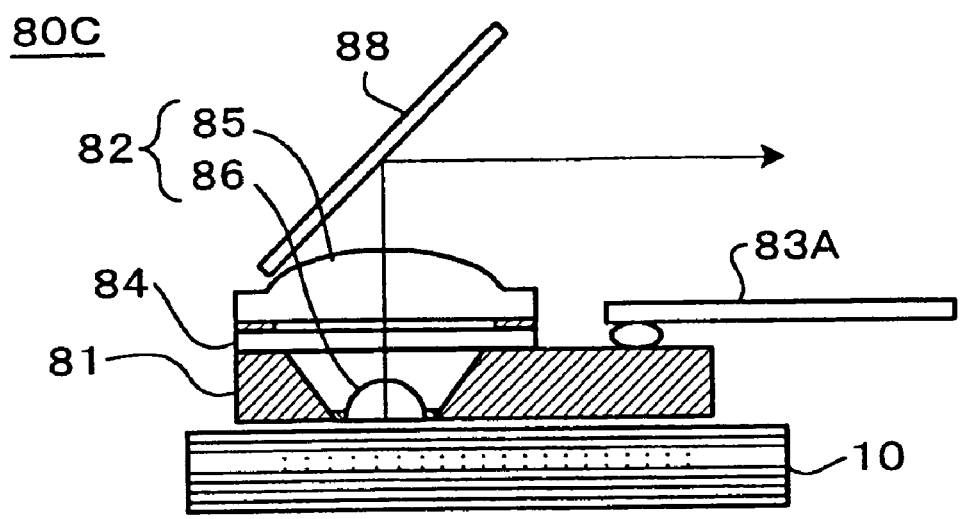
FIG. 13 is a schematic diagram showing another example of a flying optical head.

In addition, an optical element such as a mirror or the like may be additionally included in the flying optical head 80. FIG. 13 is a schematic diagram showing the construction of a flying optical head 80C including a mirror 88. The mirror 88 is disposed above the objective lens 85, and light travels between the objective lens 85 and the optical system of the optical-recording-medium playback apparatus via the mirror 88.

A suspension 83A is connected to the slider member 81 at one end of the slider member 81 with a suspension spring.

Figure 14:
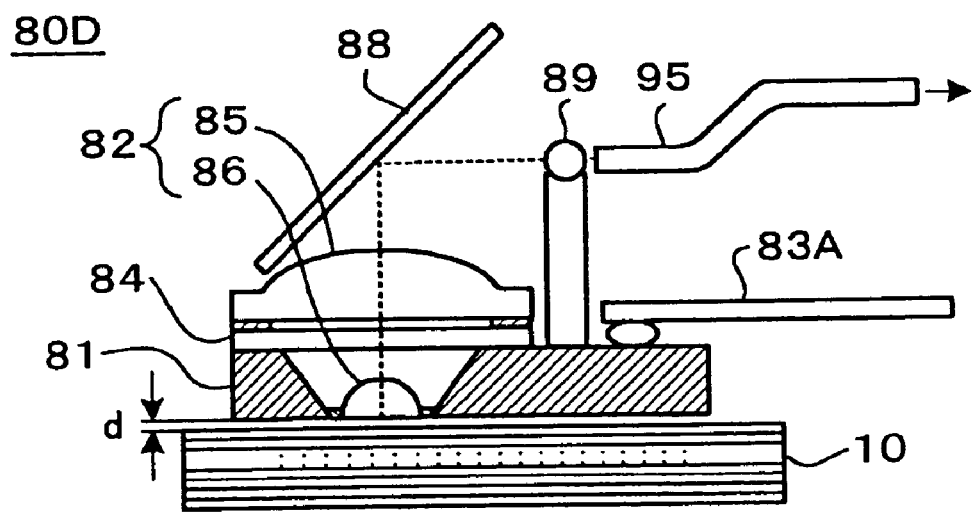
FIG. 14 is a schematic diagram showing another example of a flying optical head.

FIG. 14 is a schematic diagram showing the construction of a flying optical head 80D including a condenser lens 89 and an optical fiber 95. Light emitted from the objective lens 85 is guided to an end of the optical fiber 95 via the mirror 88 and the condenser lens 89. In addition, light emitted from the end of the optical fiber 95 is incident on the objective lens 85 via the condenser lens 89 and the mirror 88. Accordingly, light travels between the flying optical head 80D and the optical system of the optical-recording-medium playback apparatus via the optical fiber 95.

Sixth Embodiment

Figure 15:
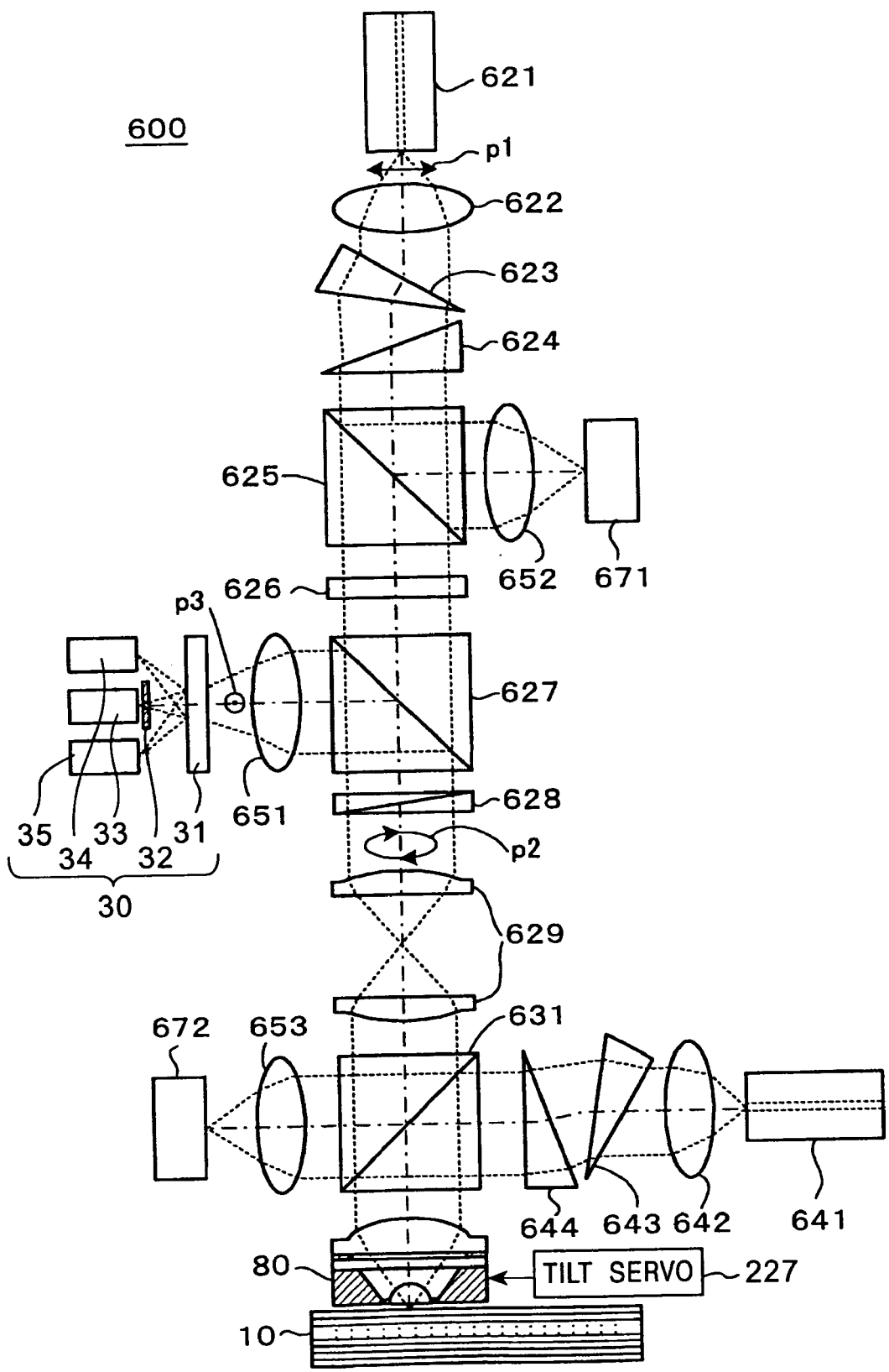
FIG. 15 is a schematic diagram showing the overall construction of an optical-recording-medium playback apparatus according to a sixth embodiment of the present invention.

FIG. 15 is a schematic diagram showing an optical-recording-medium playback apparatus 600 according to a sixth embodiment of the present invention. As shown in FIG. 15, the optical-recording-medium playback apparatus 600 includes an optical recording medium 10, a light source 621, a collimator lens 622, anamorphic prisms 623 and 624, a non-polarization beam splitter (NPBS) 625, a spherical aberration corrector 626, a polarization beam splitter 627, a quarter-wavelength plate (QWP) 628, an afocal optical system 629, a dichroic combiner 631, a flying optical head 80, and a tilt servo unit 227.

In addition, the optical-recording-medium playback apparatus 600 further includes a light source 641, a collimator lens 642, anamorphic prisms 643 and 644, condenser lenses 651 to 653, a light-receiving unit 30, and monitor photo diodes (PDs) 671 and 672.

The light source 621 is used for generating an RF signal and a focus error signal, and has a wavelength λ of, for example, 400 nm. The resolution at which information is read out from the optical recording medium 10 increases as the wavelength decreases.

The collimator lens 622 collimates light emitted from the light source 621.

An anamorphic optical system is constructed of the anamorphic prisms 623 and 624, and the shape of light emitted from the collimator lens 622 is adjusted to the shape corresponding to the non-polarization beam splitter 625.

The non-polarization beam splitter 625 reflects a part of light incident thereon and transmits the remaining part of the incident light. The ratio of the amount of reflected light to the amount of transmitted light is set to, for example, 1:9.

The spherical aberration corrector 626 corrects the spherical aberration which occurs according to the position of each recording layer 11 and optimizes the focusing performance at which light is focused on the optical recording medium 10. The spherical aberration corrector 626 may be constructed of, for example, a liquid crystal device.

The polarization beam splitter 627 transmits light of a predetermined polarization and reflects light of another polarization.

The quarter-wavelength plate 628 provides a phase difference of a quarter wavelength between orthogonally polarized light waves.

The afocal optical system 629 includes a pair of lenses, and the focal position of light emitted from the light source 621 and focused on the optical recording medium 10 is adjusted by changing the distance between these lenses.

The dichroic combiner 631 combines light waves with a plurality of wavelengths. In the present embodiment, the dichroic combiner 631 combines light emitted from the light source 621 and light emitted from the light source 641.

The light source 641 is used for generating the tracking error signal.

The collimator lens 642 collimates light emitted from the light source 641.

Another anamorphic optical system is constructed of the anamorphic prisms 643 and 644, and the shape of light emitted from the collimator lens 642 is adjusted to the shape corresponding to the dichroic combiner 631.

The condenser lenses 651 to 653 serve to focus light onto the light-receiving unit 30 and the monitor PDs 671 and 672.

The light-receiving unit 30 includes a holographic optical element 31, a pinhole 32, and photodiodes 33 to 35, and is constructed similarly to that of the first embodiment.

The monitor PDs 671 and 672 monitor outputs of the light sources 621 and 641, respectively.

It is advantageous to use the light source 641 and the anamorphic prisms 643 and 644 when the optical recording medium 10A having the groove layer 12A is used. When the optical recording medium 10B in which each recording layer 11B is provided with a tracking pattern is used, the light source 641 and the anamorphic prisms 643 and 644 may be omitted and the light source 621 may be used for generating both the RF signal and the tracking error signal.

Linearly polarized light (polarization state is p1) emitted from the light source 621 is collimated by the collimator lens 622, passes through the anamorphic prisms 623 and 624, where the shape of the light is adjusted, and is incident on the non-polarization beam splitter 625. A part of the light incident on the non-polarization beam splitter 625 passes through the condenser lens 652 and is incident on the monitor PD 671, where the output from the light source 621 is monitored.

Most part of light incident on the non-polarization beam splitter 625 passes through the spherical aberration corrector 626 and the polarization beam splitter 627, is changed to circularly polarized light (polarization state is p2) by the quarter-wavelength plate 628, and is incident on the optical recording medium 10 via the afocal optical system 629, the dichroic combiner 631, and the flying optical head 80.

The light incident on the optical recording medium 10 is reflected by the recording layers 11, passes through the flying optical head 80, the dichroic combiner 631, and the afocal optical system 629, and is incident on the quarter-wavelength plate 628. The light incident on the quarter-wavelength plate 628 is changed to linearly polarized light (polarization state is p3) whose polarization direction is perpendicular to that of the linearly polarized light which travels toward the optical recording medium 10, is reflected by the polarization beam splitter 627, and is focused on the light-receiving unit 30 by the condenser lens 651. Then, the RF signal and the focus error signal are generated.

The light emitted from the light source 641 is collimated by the collimator lens 642, is incident on the anamorphic prisms 643 and 644, where the shape of the light is adjusted, and is incident on the dichroic combiner 631. A part of the light incident on the dichroic combiner 631 passes through the condenser lens 653 and is incident on the monitor PD 672, where the output from the light source 641 is monitored.

Most part of light incident on the non-polarization beam splitter 631 passes through the flying optical head 80 and is incident on the optical recording medium 10. The light incident on the optical recording medium 10 is reflected by the layer on which the tracking pattern is formed (that is, the groove layer 12A shown in FIG. 2A or one of the recording layers 11B shown in FIG. 2B), passes through the flying optical head 80, the dichroic combiner 631, and the afocal optical system 629, is incident on the quarter-wavelength plate 628. The light incident on the quarter-wavelength plate 628 is changed to linearly polarized light, is reflected by the polarization beam splitter 627, and is focused on the light-receiving unit 30 by the condenser lens 651. Then, the tracking error signal is generated.

Characteristics of the optical-recording-medium playback apparatus 600 according to the present embodiment will be described below.

Since the light-receiving unit 30 includes the pinhole 32, the stray light from the recording layers 11 other than the recording layer 11 from which information is to be read out can be removed and the S/N ratio of the RF signal can be increased.

In addition, since the flying optical head 80 which is in the vicinity of the optical recording medium 10 is used, the numerical aperture NA can be increased and high-resolution readout (and recording as necessary) of the optical recording medium 10 can be achieved.

Since the shape of light is adjusted by the anamorphic prisms and the spherical aberration is corrected by the spherical aberration corrector, the focusing performance at which light is focused on each recording layer 11 of the optical recording medium 10 can be increased. This contributes to high-resolution readout (and recording as necessary) of the optical recording medium 10 and reduction in the stray light.

Since the focal position on the optical recording medium 10 is adjusted by using the afocal optical system 629, it is not necessary to provide a focus control mechanism in the flying optical head 80. Accordingly, the structure of the flying optical head 80 can be simplified.

Seventh Embodiment

Figure 16:
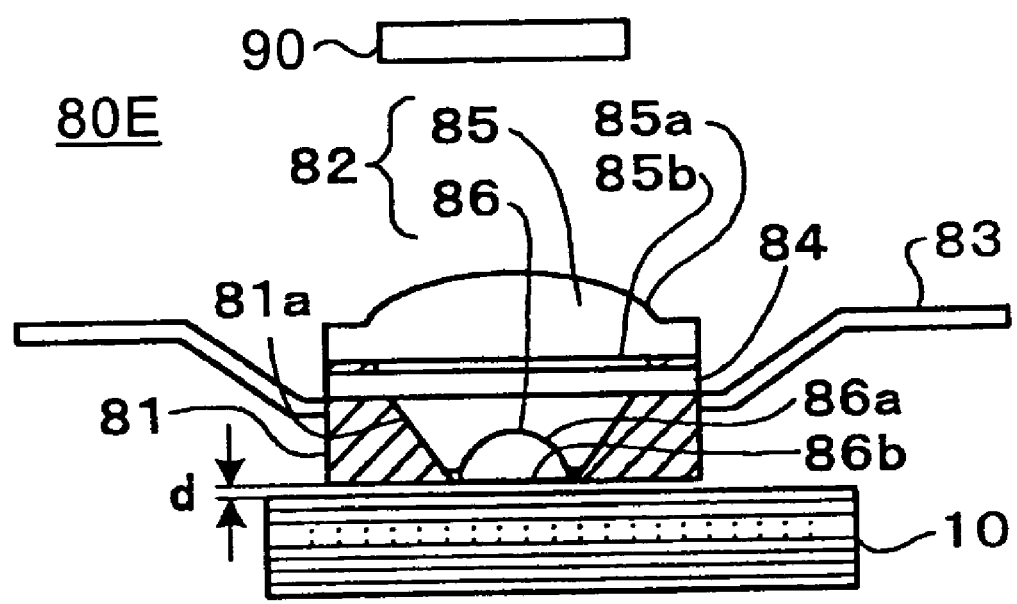
FIG. 16 is a schematic diagram showing another example of a flying optical head.

According to a seventh embodiment of the present invention, an optical-recording-medium playback apparatus includes a flying optical head 80E shown in FIG. 16. The overall construction of the optical-recording-medium playback apparatus according to the seventh embodiment is similar to that of the sixth embodiment shown in FIG. 15.

(Detailed Description of Optical Recording Medium)

First, the detailed construction of the optical recording medium 10 will be described below with reference to FIGS. 2A and 2B.

As described above with reference to FIG. 2A, the optical recording medium 10A includes the recording layers 11A and the groove layer 12A. The recording layers 11A are provided with reflective recording pits (or recording marks) formed thereon. Alternatively, transmission recording pits may also be provided instead of the reflective recording pits. When light is incident on the recording pits, reflection or transmission of the light occurs and information can be read out on the basis of the intensity, etc., of the reflected or transmitted light.

Alternatively, light with a wavelength which is different from that of the incident light (for example, fluorescent light) may be generated by the recording pits, and information may be read out by using the generated light. This light may either be coherent or incoherent.

Since normal fluorescent light is incoherent, incoherent light corresponding to the information recoded on the recording layers 11A can be obtained by forming the recording pits composed of a fluorescent material over the recording layers 11A.

The groove layer 12A has guide grooves used as a reference for tracking in the operation of reading out the information recorded on the recording layers 11A, and tracking is performed by using light which is reflected, transmitted, or generated by the guide grooves.

In addition, as described above with reference to FIG. 2B, the optical recording medium 10B does not have a layer which is exclusively used for tracking. Instead, guide grooves used as a reference for tracking are formed on each of the recording layers 11B. In the present embodiment, either one of the optical recording media 10A and 10B may be used as the optical recording medium 10.

(Construction of Flying Optical Head)

FIG. 16 is a schematic diagram showing a flying optical head 80E included in the optical-recording-medium playback apparatus according to the present embodiment. The construction of the flying optical head 80E is similar to that of the flying optical head 80 shown in FIG. 10 except that an aberration corrector 90 is disposed on a path of light incident on the flying optical head 80E.

The flying optical head 80E is a focusing optical system for focusing light on the optical recording medium 10, and is connected to the optical system of the optical-recording-medium playback apparatus with collimated light.

Although the flying optical head 80E shown in FIG. 16 is constructed such that the aberration corrector 90 is added to the flying optical head 80 shown in FIG. 10, the aberration corrector 90 may also be added to the flying optical heads 80A to 80D shown in FIGS. 11 to 14, respectively.

The aberration corrector 90 is an optical element which corrects aberration (mainly spherical aberration) which occurs due to the movement of focal point to each recording layer 11 in order to increase the focusing efficiency of light focused on each recording layer 11 of the optical recording medium 10. The aberration corrector 90 is constructed of, for example, a liquid crystal device.

In the aberration corrector 90, an aberration correction value can be changed in accordance with a voltage applied thereto. Accordingly, the aberration can be accurately corrected in accordance with the focal position of the flying optical head 80E.

The spherical aberration changes according to the position of the recording layer 11 on which the light is focused. Even when the spherical aberration is corrected at the recording layer 11 positioned at the center, a relatively large spherical aberration occurs when light is focused on the recording layer 11 which is separated from the center.

Figure 17A:
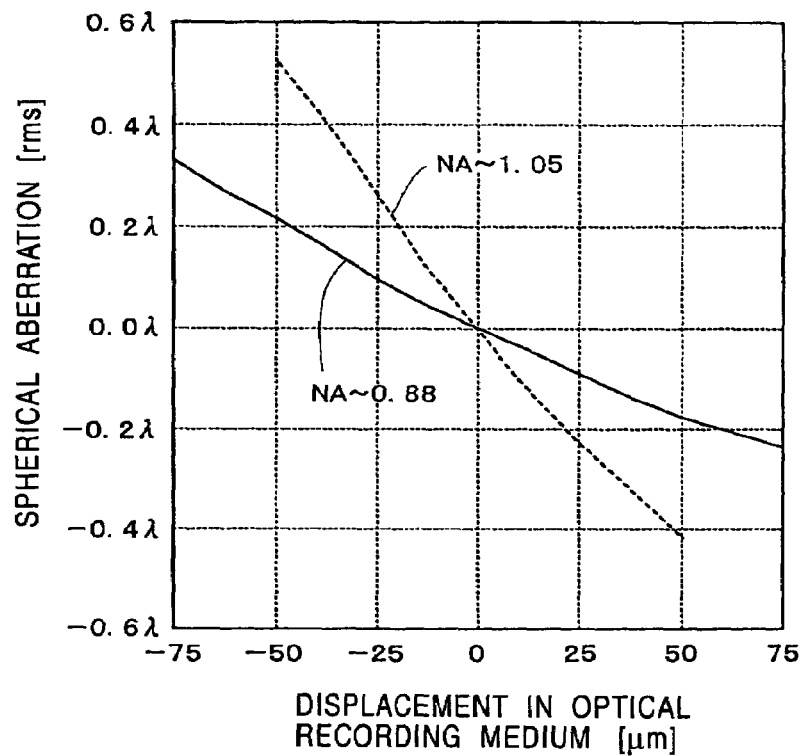
FIGS. 17A and 17B are graphs showing the calculation results of the spherical aberration.
Figure 17B:
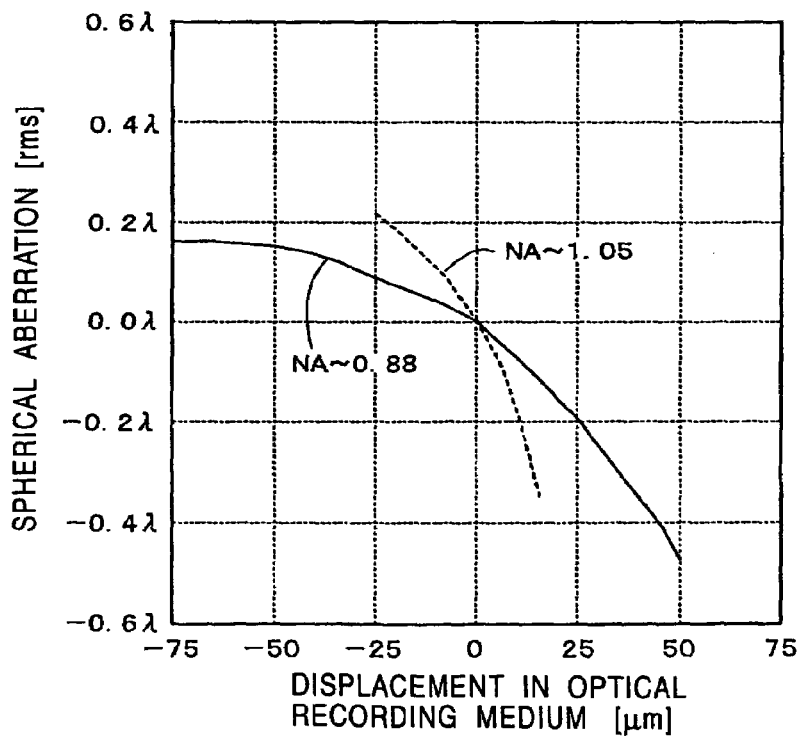

FIGS. 17A and 17B are graphs showing the calculation results of the spherical aberration. The calculation is performed under the following conditions: the material of the optical recording medium 10 is $SiO_2$, and the central layer (the recording layer 11 at the center) is approximately 500 μm below the center of the surface 86a (top point of a curved surface) of the solid immersion lens 86.

FIG. 17A corresponds to the flying optical head 80E or a flying optical head constructed by adding the aberration corrector 90 to the flying optical head 80A shown in FIG. 11 (the focus control mechanism is included in the flying optical head), and FIG. 17B corresponds to a flying optical head constructed by adding the aberration corrector 90 to the flying optical head 80B shown in FIG. 12 (the focus control mechanism is provided separately from the flying optical head). In the graphs, the solid line and the chain line show the calculation results where the numerical aperture NA is 0.88 and 1.047, respectively.

With reference to FIG. 17A, when the numerical aperture NA is 1.047, the spherical aberration changes by $0.2\lambda$ [rms] when the focal position is shifted by 50 μm. The spherical aberration of $0.2\lambda$ [rms] can be corrected by using, for example, a commercial spherical-aberration-correcting liquid crystal device.

When the interval between the recording layers 11 is 5 μm, the displacement of 50 μm corresponds to ten layers. Accordingly, readout from the optical recording medium 10 having about ten recording layers 11 can be achieved by using, for example, a gradation-type spherical-aberration-correcting liquid crystal device produced by Asahi Glass, Co., Ltd. As a result, the memory capacity of the optical recording medium 10 can be increased by ten times or more compared to that of an optical recording medium including only one layer (when the numerical aperture NA is 1.047).

Although the interval of 5 μm is smaller than that of known DVDs having a two-layer structure, it is large enough to avoid Rayleigh scattering (when the interval between the layers is too small, there is a possibility that Rayleigh scattering will be a problem). This is advantageous when a playback method in which fluorescent light is detected is used.

Since normal fluorescent light is incoherent, the information readout operation using incoherent light can be achieved by spreading the recording pits composed of a fluorescent material over the recording layers 11.

Alternatively, the information readout operation using incoherent light can also be achieved by using a light source which emits incoherent light (for example, a light source which does not emit a laser beam) as the light source 621 for providing the incident light on the recording layers 11.

By using incoherent light to read out information from the optical recording medium 10, optical interference between the recording layers 11 can be suppressed and the interval between the recording layers 11 in the optical recording medium 10 can be reduced.

According to the present embodiment, the recording layer 11 on which the light is focused is determined from among the plurality of recording layers 11. A method for determining the recording layer 11 on which the light is focused will be described below with reference to FIGS. 7A and 7B.

As described above, with reference to FIGS. 7A and 7B, the intensity of the RF signal is at a maximum when the focal depth is set to the center of each layer, and the intensity of the focus error signal increases or decreases when the focal depth is shifted from the center of each layer.

This is because loss of light incident on the optical recording medium 10 increases as the depth of the recording layer 11 increases. In order to maintain the intensity of returning light constant, the intensity of incident light must be changed in accordance with the depth of the recording layer 11.

Accordingly, since the intensity of the returning light corresponds to the depth of the recording layer 11, the intensity of light which returns from positions around the center of each recording layer 11 (central value) can be used as a reference (reference value) for identifying each recording layer 11. Thus, a table showing the relationship between each recording layer 11 and the reference value thereof (intensity of light which returns from the positions around the center of each recording layer 11) is stored in a memory unit of the optical-recording-medium playback apparatus, and the recording layer 11 on which the light is focused is determined on the basis of the intensity of the returning light by referring to this table.

The present embodiment is substantially similar to the sixth embodiment with regard to other points, and explanations thereof are thus omitted.

Characteristics of the optical-recording-medium playback apparatus according to the present embodiment will be described below.

According to the present embodiment, an optical head with a numerical aperture NA of one or more can be provided for the readout/recording operation of the optical recording medium 10. More specifically, by using the optical head which is in the vicinity of the optical recording medium 10, the numerical aperture NA can be increased and high-resolution readout (and recording as necessary) of the optical recording medium 10 can be achieved.

In addition, since the optical recording medium 10 includes a plurality of (for example, ten) recording layers 11, the memory capacity of the optical recording medium 10 can be easily increased.

In addition, since the optical head can be constructed of a flying optical system (flying optical head 80E), the information can be reliably read out from or recorded on the optical recording medium 10 having a plurality of recording layers 11.

Light with a wavelength different from that of incident light (for example, fluorescent light) can be generated from the recording pits when light is incident thereon, and thereby the information can be read out efficiently.

In addition, optical interference between the recording layers 11 can be suppressed by generating incoherent light at the recording pits. Accordingly, the recording layers 11 can be designed by taking only the Rayleigh scattering into account, and the optical interference can be ignored.

In addition, light is focused on one of the recording layers 11 of the optical recording medium 10, and not on the top surface of the optical recording medium 10. Therefore, even if dust or the like is adhered on the optical recording medium 10, the readout operation is not easily influenced.

In addition, since light is focused on one of the recording layers 11 of the optical recording medium 10 and not on the top surface of the optical recording medium 10, even when a lubricant is provided between the bottom surface of the flying optical head 80E and the optical recording medium 10, the lubricant is not easily influenced by heat, etc., due to the focusing light.

The optical-recording-medium playback apparatus of the seventh embodiment is constructed such that the flying optical head 80E is used in place of the flying optical head 80 of the optical-recording-medium playback apparatus 600 according to the sixth embodiment shown in FIG. 15. Alternatively, however, the above-described flying optical head 80E may also be used in place of the objective lens in the optical-recording-medium playback apparatuses according to second to fourth embodiments of the present invention.

Eighth Embodiment

An eighth embodiment of the present invention is characterized by an optical recording medium included in an optical-recording-medium playback apparatus. The overall construction of the optical-recording-medium playback apparatus according to the eighth embodiment is similar to that of the first embodiment shown in FIG. 1.

(Detailed Description of Optical Recording Medium)

The construction of an optical recording medium 10C according to the present embodiment will be described below with reference to FIG. 18.

Figure 18:
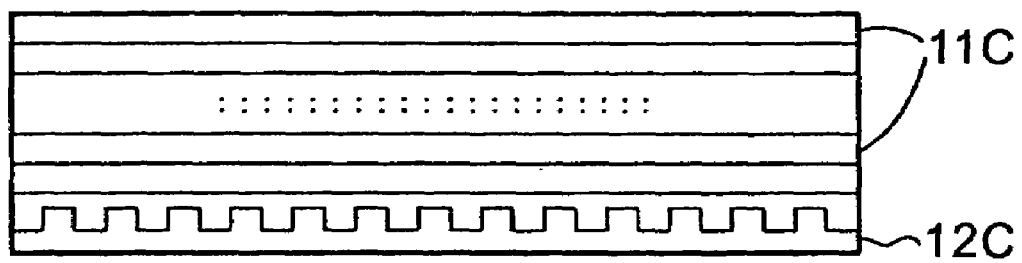
FIG. 18 is an enlarged sectional view showing another example of an optical recording medium.

FIG. 18 is an enlarged sectional view of the optical recording medium 10C. The optical recording medium 10C includes a plurality of recording layers 11C and a tracking layer 12C which is disposed at the bottom. Information is recorded on the recording layers 11C such that it can be read out by optical means. More specifically, the information is recorded in the form of pits (or recording marks). In addition, the tracking layer 12C is provided with pits which are used as a reference for tracking in the readout operation of the information recorded on the recording layers 11C.

The recording layers 11C are not provided with pits or grooves for tracking, and tracking is performed by using the tracking layer 12C.

Figure 19A:
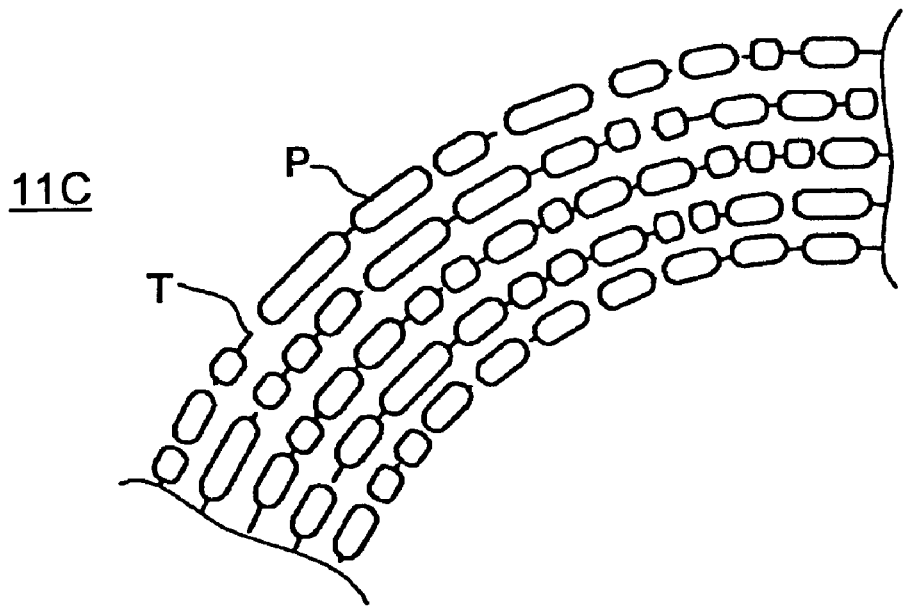
FIGS. 19A and 19B are enlarged top views of a recording layer and a tracking layer, respectively.
Figure 19B:
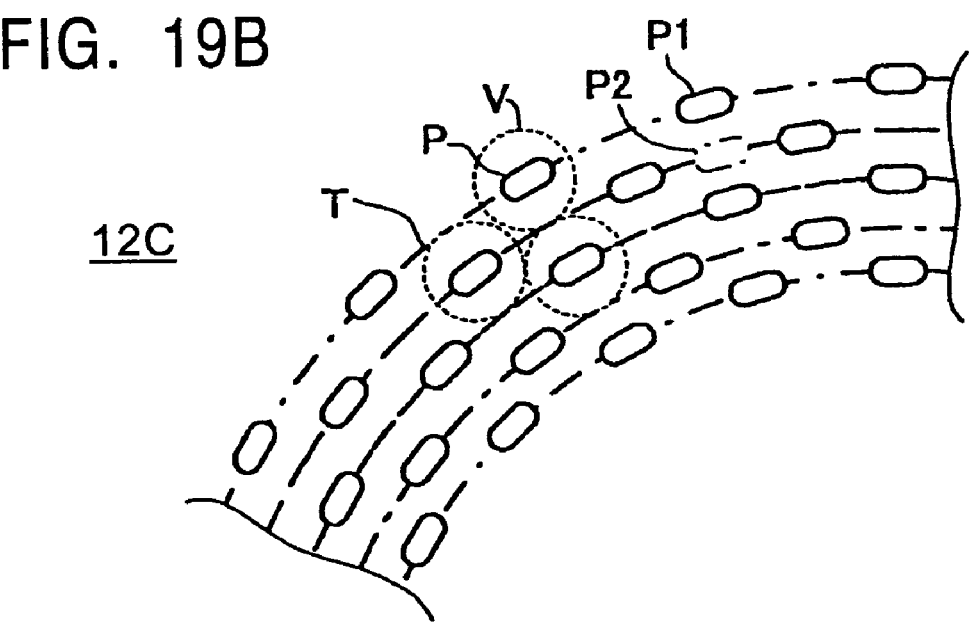

FIGS. 19A and 19B are enlarged top views of one of the recording layers 11C and the tracking layer 12C, respectively.

In the recording layer 11C, pits P are formed along tracks T in accordance with the information recorded thereon. More specifically, the positions at which the pits P are formed along the tracks T are not greatly restricted.

In comparison, in the tracking layer 12C, the pits P formed on the tracks T are separated from each other. More specifically, the pits P are arranged with predetermined intervals in both the direction along the tracks T (circumferential direction) and the direction perpendicular to the tracks T (radial direction). Accordingly, when a pit P is disposed at a certain point on a track T, no other pits P are disposed in the vicinity V of this pit P on the same track T or the adjacent tracks T. In other words, the pits P on the adjacent tracks T are not disposed at positions such that the distance between the pits P is the same as the shortest distance between the adjacent tracks T (positions shown by a pit P1 and an imaginary pit P2).

Preferably, the pits P are arranged such that the interval between the adjacent pits P are at a maximum. The reason for this will be described below.

The reason why the pits P for tracking formed on the tracking layer 12C are separated from each other will be described below.

Figure 20:
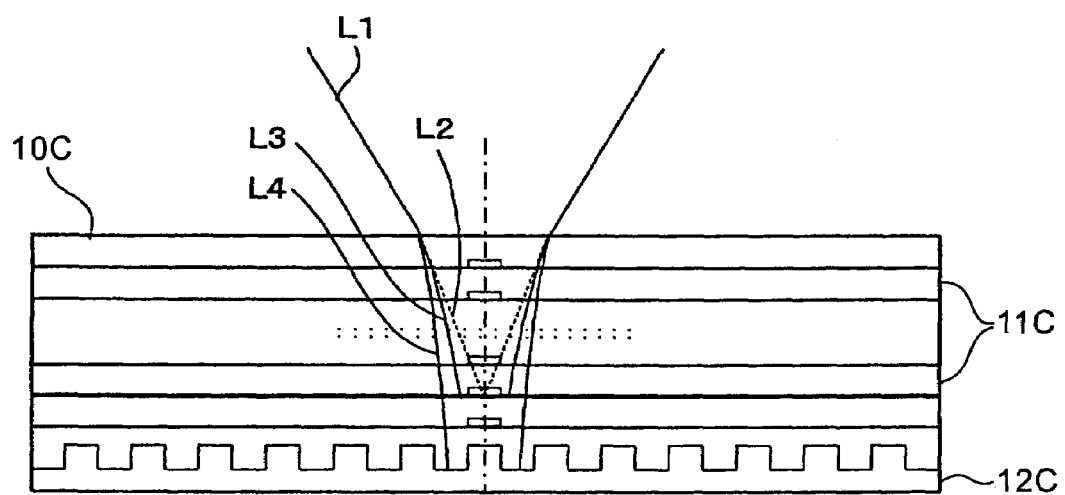
FIG. 20 is an enlarged sectional view showing the manner in which light is incident on the optical recording medium.

FIG. 20 is a sectional view showing the manner in which light is incident on the optical recording medium 10C.

The incident light L1 on the optical recording medium 10C is focused on one of the recording layers 11C from which information is read out. At this time, ideally, the incident light L1 should be focused to a single point as shown by the chain lines L2. However, the incident light L1 actually cannot converge to a single point because of the wave nature of light, and converges to a pattern of the Airy disk whose diameter is $1.22\lambda/NA$ ($\lambda$ is the wavelength and NA is the numerical aperture), as shown by focused light L3.

The wavelength of a light source for providing incident light L4 on the tracking layer 12C is different from that of a light source for providing the incident light L3 on the recording layer 11C. When the wavelength of the light source used for tracking is different from the wavelength of the light source used for recording/playback, undesirable interference between the two light sources can be prevented and the recording/playback signal and the tracking error signal can be reliably obtained. In this case, the wavelength of the light source for obtaining the tracking error signal is longer that that of the light source for recording/playback.

As the wavelength increases and the numerical aperture NA decreases, the area of the Airy disk (the area to the pattern to which light converges) increases. However, since it is not always necessary to form the pits on the tracking layer 12C with high density in the direction of linear velocity, even when the spot size is relatively large, crosstalk between the adjacent pits can be prevented by arranging the pits such that they are not in the vicinity of each other.

When the light for tracking is incident on the tracking layer 12C, pits of different tracks are preferably avoided from being placed within the focal spot of the incident light at the same time. This is because information from different tracks will be included in the tracking error signal in such a case. This risk increases when the recording density of the optical recording medium 10C increases and the interval between the tracks decreases.

Accordingly, the pits P are arranged such that the pits P on the adjacent tracks T are separated from each other by more than the shortest distance between the adjacent tracks T, so that the information from a plurality of tracks are prevented from being included in the tracking error signal.

This is the reason why the pits P on the tracking layer 12C are separated from each other and the pits P on the adjacent tracks T are shifted from each other.

When the pits P on the tracking layer 12C are separated from each other as described above, the tracking error signal cannot be output continuously. However, since it is not always necessary to continuously generate the tracking error signal, this will not be a large problem.

As described above, according to the optical recording medium 10C of the present embodiment, the pits P are arranged on the tracking layer 12C such that the pits P on the adjacent tracks T are separated from each other by more than the shortest distance between the adjacent tracks T. Accordingly, the signal from the pits P formed on the track T adjacent to the one at which the tracking error signal is generated can be prevented from being included in the tracking error signal.

Characteristics of the optical recording medium 10C according to the present embodiment will be described below.

Since the tracking pattern (pits or the like) is not formed on each of the recording layers 11C, the interval between the recording layers 11C can be reduced.

When the interval between the recording layers 11C can be reduced, the number of recording layers 11C can be increased, and the memory capacity of the optical recording medium 10C can be increased accordingly. This is because the total thickness of the recording layers 11C (the product of the interval between the layers and the number of layers) is preferably small from the viewpoint of the spherical aberration.

In addition, since the tracking pattern is not formed on each of the recording layers 11C, the manufacturing cost of the optical recording medium 10C can be reduced.

In addition, since the pits P on the tracking layer 12C are arranged such that they are separated from each other, the tracking error signals obtained from the adjacent tracks can be prevented from being mixed. This means that the recording density of the optical recording medium 10C can be easily increased (the interval between the tracks can be easily reduced).

The present embodiment is substantially similar to the first embodiment with regard to other points, and explanations thereof are thus omitted.

The optical-recording-medium playback apparatus of the eighth embodiment is constructed such that the optical recording medium 10C is used in the optical-recording-medium playback apparatus 100 according to first embodiment shown in FIG. 1. Alternatively, however, the optical recording medium 10C may also be used in the optical-recording-medium playback apparatuses according to the third to sixth embodiments of the present invention.

Other Embodiments

The present invention is not limited to the above-described embodiments, and various additions and modifications are possible within the scope of the present invention, for example, as follows:

(1) The optical-recording-medium playback apparatus may either be of a fixed type in which the optical recording medium is fixed to the optical-recording-medium playback apparatus or of a removable (detachable) type in which the optical recording medium can be detached. When the optical-recording-medium playback apparatus is of the removable type, an optical-recording-medium supporting member such as a stage or a table is provided in the optical-recording-medium playback apparatus, and the optical recording medium is placed on the optical-recording-medium.

(2) The shape of the optical recording medium may be a disc shape, or any other suitable shape. In addition, information may be recorded on the optical recording medium by various methods, and the recording method is not limited as long as the information recorded on the optical recording medium can be read out by optical means.

(3) Although the case in which the optical-recording-medium playback apparatus is used for playing back (reading out) information recorded on the optical recording medium has been mainly described in the above-described embodiments, information may also be recorded or deleted by using the optical-recording-medium playback apparatus. For example, a unit for optically recording information may also be included in the optical-recording-medium playback apparatus as in magneto-optical disk drives.

(4) Although the case in which light reflected by the recording layers is used for reading out information from the optical recording medium is mainly described above, the information can also be read out by using light transmitted through the recording layers or light generated by the recording layers (for example, fluorescent light).

What is claimed is:

1. An optical-recording-medium playback apparatus comprising:
    a light-emitting unit configured to emit light;
    an optical recording medium having a plurality of recording layers from which information can be optically read out;
    a flying optical head configured to fly above the optical recording medium supported by an air flow and focus the light emitted from the light-emitting unit onto one of the recording layers of the optical recording medium, the flying optical head having a lens configuration including at least a solid immersion lens and an objective lens, the lens configuration having a numerical aperture NA of more than 1, the solid immersion lens having a surface which faces a surface of the optical recording medium with a gap therebetween of less than 100 nm;
    an optical member configured to focus returning light from the optical recording medium responsive to the light focused by the optical head;
    a light-receiving unit configured to receive the returning light focused by the optical member; and
    a focal-position-adjusting means disposed between the solid immersion lens and the objective lens, configured to adjust a focal position of the light focused by the optical head in the thickness direction of the optical recording medium.

2. An optical-recording-medium playback apparatus comprising:
    a light-emitting unit configured to emit light;
    a stage configured to retain an optical recording medium having a plurality of recording layers from which information can be optically read out;
    a flying optical head configured to fly above the optical recording medium supported by an air flow and focus the light emitted from the light-emitting unit onto one of the recording layers of the optical recording medium, the flying optical head having a lens configuration including at least a solid immersion lens and an objective lens, the lens configuration having a numerical aperture NA of more than 1, the solid immersion lens having a surface which faces a surface of the optical recording medium with a gap therebetween of less than 100 nm;
    an optical member configured to focus returning light from the optical recording medium responsive to the light focused by the optical head;
    a light-receiving unit configured to receive the returning light focused by the optical member; and
    a focal-position-adjusting means disposed between the solid immersion lens and the objective lens, configured to adjust a focal position of the light focused by the optical head in the thickness direction of the optical recording medium.

3. The optical-recording-medium playback apparatus according to claim 1, wherein the flying optical head performs an information read/recording of the optical recording medium by utilizing near-field optical effects.

4. The optical-recording-medium playback apparatus according to claim 1, wherein the optical recording medium has recording pits composed of a fluorescent material, the returning light from the optical recording medium is incoherent fluorescent light.

5. The optical-recording-medium playback apparatus according to claim 4, wherein the wavelength of the returning light is different from the wavelength of the light emitted from the light-emitting unit.

6. The optical-recording-medium playback apparatus according to claim 1, further comprising:
    a recording-layer-identifying means configured to identify the recording layer on which the light emitted from the light-emitting unit is focused, wherein
    the recording-layer-identifying means identifies each of the recording layers by referring to a table which shows the relationship between the depth of each of the recording layers and the intensity of the returning light.

7. The optical-recording-medium playback apparatus according to claim 1, wherein the focal-position-adjusting means comprises a refractive-index-varying device.

8. The optical-recording-medium playback apparatus according to claim 7, wherein the refractive-index-varying device is at least two wedge prisms.

9. The optical-recording-medium playback apparatus according to claim 1, further comprising:
    a pinhole which is disposed between the optical member and the light-receiving unit.

10. The optical-recording-medium playback apparatus according to claim 9, wherein the light-emitting unit, the pinhole, and the light-receiving unit are integrally formed on a single substrate of a confocal laser coupler.

11. The optical-recording-medium playback apparatus according to claim 1, further comprising:
    detecting means configured to detect at least one of the focus, tracking, and tilt states of the optical recording medium.

12. The optical-recording medium playback apparatus according to claim 8, wherein the at least two wedge prisms form a plate-shaped member.

13. The optical-recording medium playback apparatus according to claim 12, wherein the plate-shaped member has a thickness adjustable by changing a positional relationship between the two wedge prisms.

* * * * *

UNITED STATES PATENT AND TRADEMARK OFFICE
CERTIFICATE OF CORRECTION

PATENT NO.         : 7,342,869 B2                                    Page 1 of 1
APPLICATION NO. : 10/609615
DATED              : March 11, 2008
INVENTOR(S)       : Takeshi Mizuno It is certified that error appears in the above-identified patent and that said Letters Patent is hereby corrected as shown below:

Column 17, line 15, change "$\pm 0.2\lambda\,\mu m$" to --$\pm 200\,\mu m$--.

Signed and Sealed this

Eleventh Day of November, 2008

JON W. DUDAS
*Director of the United States Patent and Trademark Office*